(12) United States Patent
Zizys et al.

(10) Patent No.: US 9,691,430 B2
(45) Date of Patent: Jun. 27, 2017

(54) OPPORTUNISTIC FRAME CACHING

(75) Inventors: Giedrius Zizys, Redmond, WA (US);
Tzong-Jhy Wang, Redmond, WA (US);
Victor E. Santodomingo, Redmond,
WA (US); William David Sproule,
Woodinville, WA (US); **Mike W.
Morrison**, Issaquah, WA (US)

(73) Assignee: Microsoft Technology Licensing, LLC,
Redmond, WA (US)

( * ) Notice: Subject to any disclaimer, the term of this patent is extended or adjusted under 35 U.S.C. 154(b) by 1164 days.

(21) Appl. No.: 12/752,166

(22) Filed: Apr. 1, 2010

(65) Prior Publication Data

US 2011/0246883 A1 Oct. 6, 2011

(51) Int. Cl.
*H04N 19/00* (2014.01)
*G11B 27/034* (2006.01)
(Continued)

(52) U.S. Cl.
CPC .......... *G11B 27/034* (2013.01); *H04L 65/607* (2013.01); *H04L 65/80* (2013.01); *H04N 19/40* (2014.11)

(58) Field of Classification Search
CPC .. G06F 13/00; G06F 3/01; H04N 5/77; H04N 5/783; H04N 5/91; H04N 7/26; H04N 7/50; H04N 7/26271; H04N 7/26244; H04N 9/8042; H04N 5/85
USPC ............... 386/343, 353, 278, 281, 283, 318, 386/E5.001, 346, E5.052; 360/13; 369/83, 275.1; 715/723-726; 725/37, 725/107, 110, 11, 112, 113, 41; 707/722, 707/770, 914, 915, 916, 943, 999.01, 707/999.104, E17.009, 912, 913, E17.12, 707/104, 103, 512, 104.1; 709/203; 711/113, 118, E12.017; 395/200.77;
(Continued)

(56) References Cited

U.S. PATENT DOCUMENTS

| 6,192,183 B1 | 2/2001 | Taniguchi et al. |
| 6,226,038 B1 | 5/2001 | Frink et al. |

(Continued)

FOREIGN PATENT DOCUMENTS

| CN | 1525452 A1 | 9/2004 |
| CN | 102984600 A | 3/2013 |

(Continued)

OTHER PUBLICATIONS

"International Search Report", Mailed Date: Apr. 28, 2011, Application No. PCT/US2010/049004, Filed Date: Sep. 15, 2010, pp. 8.

(Continued)

*Primary Examiner* — Frank Huang
(74) *Attorney, Agent, or Firm* — David Chin; Chin IP, PLLC

(57) ABSTRACT

Enhanced, efficient source frame decoding for user previewing is implemented by decoding and caching source frames of an input file that a user is interested in. Source frames for a user preview session are identified and decoded first to enhance user satisfaction with more timely preview segments for review. Additional source frames continue to be decoded on the fly to opportunistically enhance the current preview segment and to be prepared for additional preview segments and/or output file generation.

20 Claims, 13 Drawing Sheets

(51) Int. Cl.
*H04L 29/06* (2006.01)
*H04N 19/40* (2014.01)

(58) Field of Classification Search
USPC .......... 348/394, 41, 394.1, E5.006; 345/302, 345/800, 815; 375/800, 815, 240, 375/E7.004, E7.253, 240.1
See application file for complete search history.

(56) References Cited

U.S. PATENT DOCUMENTS

| | | | |
|---|---|---|---|
| 6,975,752 B2* | 12/2005 | Dixon et al. | 382/132 |
| 7,215,876 B2* | 5/2007 | Okada et al. | 386/239 |
| 7,242,847 B1 | 7/2007 | Davies et al. | |
| 7,280,738 B2* | 10/2007 | Kauffman et al. | 386/281 |
| 7,417,646 B1 | 8/2008 | Larsen | |
| 7,430,361 B2* | 9/2008 | Roelens | 386/343 |
| 7,457,915 B2 | 11/2008 | Getzinger | |
| 7,669,121 B2* | 2/2010 | Kiilerich | 715/249 |
| 7,733,962 B2* | 6/2010 | Weiss et al. | 375/240.25 |
| 7,860,996 B2* | 12/2010 | Musayev et al. | 709/231 |
| 2001/0014891 A1 | 8/2001 | Hoffert et al. | |
| 2002/0057898 A1* | 5/2002 | Normile | 386/68 |
| 2002/0146236 A1 | 10/2002 | Kauffman et al. | |
| 2003/0095504 A1* | 5/2003 | Ogier | 370/235 |
| 2004/0177155 A1 | 9/2004 | Enokida et al. | |
| 2004/0239763 A1* | 12/2004 | Notea et al. | 348/169 |
| 2005/0018775 A1* | 1/2005 | Subramanian et al. | 375/240.25 |
| 2006/0184684 A1 | 8/2006 | Weiss et al. | |
| 2007/0106681 A1 | 5/2007 | Haot et al. | |
| 2007/0133951 A1 | 6/2007 | Flecchia | |
| 2008/0040215 A1* | 2/2008 | Huang et al. | 705/14 |
| 2008/0244381 A1* | 10/2008 | Nicolaou et al. | 715/234 |
| 2009/0119322 A1 | 5/2009 | Mills et al. | |
| 2009/0310023 A1 | 12/2009 | Nakayama | |
| 2010/0178024 A1* | 7/2010 | Agarwal et al. | 386/52 |
| 2011/0238507 A1* | 9/2011 | Ben-Rubi | 705/14.73 |
| 2011/0243523 A1* | 10/2011 | Davidson et al. | 386/224 |
| 2011/0261719 A1* | 10/2011 | Welin | 370/252 |
| 2012/0137015 A1* | 5/2012 | Sun | 709/231 |
| 2012/0159499 A1* | 6/2012 | Shafiee et al. | 718/103 |

FOREIGN PATENT DOCUMENTS

| | | |
|---|---|---|
| EP | 1248466 A | 10/2002 |
| EP | 1796095 A | 6/2007 |
| WO | 9730551 A | 8/1997 |
| WO | 9739411 A | 10/1997 |
| WO | 2006083661 A1 | 8/2006 |

OTHER PUBLICATIONS

Fahmi, et al., "Proxy Servers for Scalable Interactive Video Support", IEEE Computer Society, Sep. 2001, vol. 34, Issue 09, pp. 54-60.

Kang, et al., "Multi-layered Image-based Rendering", Retrieved at <<http://research.microsoft.com/en-us/um/people/sbkang/publications/gi99.pdf>>, Proceedings of the 1999 conference on Graphics interface, 1999, pp. 9.

Chen, et al., "The Video Mesh: A Data Structure for Image-based Video Editing", Retrieved at <<http://dspace.mit.edu/bitstream/handle/1721.1/50231/MIT-CSAIL-TR-2009-062.pdf?sequence=1>>, Dec. 16, 2009, pp. 11.

Extended European Search Report for EP Pat. App. No. 10849162.2, dated Sep. 7, 2013, 11 pages.

Fahmi H. et al.; "Proxy Servers for Scalable Interactive Video Support;" Computer; Sep. 1, 2001; vol. 24, No. 9; Los Alamitos, CA, US; pp. 54-60.

Zambelli, Alex; "IIS Smooth Streaming Technical Overview;" Mar. 25, 2009; Microsoft Corp.; Redmond, WA; 18 pages.

"Office Action Issued in European Patent Application No. 10849162.2", Mailed Date: Nov. 4, 2014, 8 Pages.

"First Office Action Issued in Chinese Patent Application No. 201110087439.9", Mailed Date: Feb. 3, 2015, 16 pages.

Office Action dated Feb. 3, 2015 in CN Pat. App. No. 201110087439.9, 18 pages, including summary and/or partial English translation.

"Office Action Issued in European Patent Application No. 10849162.2", Mailed Date: Apr. 13, 2015, 11 Pages.

"Third Office Action Issued in Chinese Patent Application No. 201110087439.9", Mailed Date: Jan. 11, 2016, 13 Pages.

"Third Office Action Issued in Chinese Patent Application No. 201110087439.9", including English summary thereof, Mailed Date: Jan. 11, 2016, 16 Pages.

"Office Action Issued in Chinese Patent Application No. 201110087439.9", Mailed Date: Jul. 25, 2016, 10 Pages.

"Office Action Issued in European Patent Application No. 10849162.2", Mailed Date: Nov. 10, 2016, 19 Pages.

"Second Office Action Issued in Chinese Patent Application No. 201110087439.9", Mailed Date: Aug. 26, 2015, 13 Pages.

"Office Action Issued in European Patent Application No. 10849162.2", Mailed Date: Dec. 12, 2015, 11 Pages.

Chen, et al., "The Video Mesh: A Data Structure for Image-based Video Editing", Retrieved at <<http://dspace.mit.edu/bitstream/handle/1721.1/50231/mit-csail-tr-2009-062.pdf?sequence=1>>, Dec. 16, 2009, Pages 11.

\* cited by examiner

OPPORTUNISTIC FRAME CACHING

BACKGROUND

Users can create, or otherwise have access to, various media files, such as video files generated using a camcorder, etc., audio files stored on CDs or hard drives of a computing device, etc. Users often desire to edit one or more of these media files, also referred to herein as source files. For example, a user may be interested in only a portion of a media file, such as a small segment of a video file that captures a pet playing in the water, and the user may desire to make this smaller segment a separate, unique, output, file. As another example, a user may wish to reorder portions of a media file, such as altering the order of one or more songs stored in an audio file of several songs. As still another example, a user may wish to edit a media file by, e.g., changing one or more portions, i.e., frames or sets of frames, of a color video file to black-and-white.

Users generally wish to expeditiously preview a media, source, file, or files, or one or more portions thereof. Efforts that are expended to process source file sections a user is not interested in and/or not likely to be concerned with take time from attention to user concerns and curtail the ability to produce a preview output to a user in a timely manner.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include systems and methodology for enabling opportunistic frame caching for media processing.

In embodiments a section of an input, media, source, file that a user desires to preview for review and/or editing purposes, is processed, i.e., decoded and/or uncompressed, prior to other portions of the same source file that a user has not, or not yet, indicated an interest in. In these embodiments the user requested preview can be processed expeditiously and the user need not wait for sections of the source file the user is not interested in to be processed before the user can begin their review and editing efforts.

In embodiments sections of a source file a user has shown an interest in, i.e., requested to preview, can be processed over time in order to provide the user increasingly robust previews without perceptible time delays.

In embodiments portions of a source file a user has not requested to preview can be processed and prepared for future preview efforts within time spans in which user requests are not being attended to. In these embodiments source files can be processed in a timely manner and overall user efforts can be expeditiously and opportunistically accommodated and promoted.

BRIEF DESCRIPTION OF THE DRAWINGS

These and other features will now be described with reference to the drawings of certain embodiments and examples which are intended to illustrate and not to limit the invention, and in which.

DETAILED DESCRIPTION

In the following description, for purposes of explanation, numerous specific details are set forth in order to provide a thorough understanding of embodiments described herein. It will be apparent, however, to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
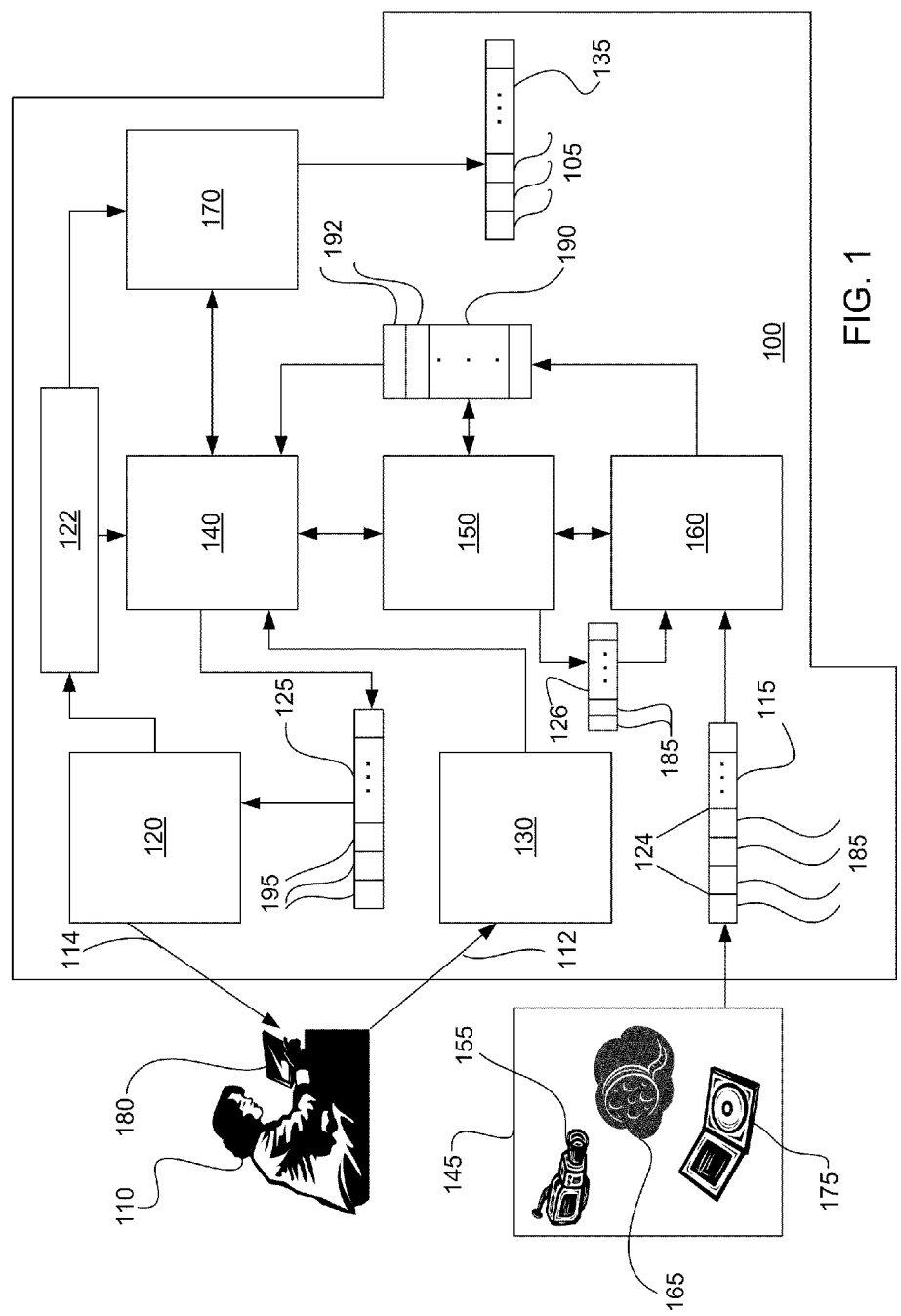
FIG. 1 depicts an embodiment opportunistic frame cache system.

Referring to FIG. 1 an embodiment opportunistic frame cache system, also referred to herein as an OFC system, 100 is hosted on, or otherwise executes upon, a computing device 180. In an embodiment a computing device 180 is a computer or any device capable of running, or executing, software instructions and interacting with a user 110 for inputting files 115, e.g., audio or visual, and performing computations or other actions on the input files 115. In an embodiment the OFC system 100 supports user editing of one or more input files 115. The input files 115, also referred to herein as source files 115, can come from a variety of sources 145, e.g., audio and/or visual, including video cameras 155, tape reels 165, CDs 175, etc. In an embodiment a source file 115 is composed of one or more source frames 185 which each contain a portion of the source file 115 content.

An embodiment OFC system 100 has several components, including a UI 130, an opportunistic transcoder 150, a media parser 160, a compositor 140, a previewer 120 and an encoder 170. In an embodiment an OFC system 100 component is a set of software instructions that when executed perform one or more tasks. In alternative embodiments an OFC system 100 can have additional, fewer and/or different components.

In an embodiment a UI (user interface) and app logic (application logic) 130 component of the OFC system 100 has the capability to accept user commands 112 and to provide output 114 to the user 110.

In an embodiment a user 110 interacts with the OFC system 100 via the UI 130 to preview, i.e., review and/or edit, one or more source files 115 to generate a finished, produced, output file, or files, 135. In an embodiment a user 110 interacts with the UI 130, e.g., sends or otherwise initiates commands 112, to orchestrate the previewing of one or more portions of one or more source files 115, also referred to herein as sampling segments.

In an embodiment a sampling segment 124 is a section of a source file 115, i.e., a contiguous set of one or more source frames 185 of a source file 115, a user 110 is interested in previewing. In an embodiment a sampling segment 124 can be two or more sections of one or more source files 115 a user 110 is interested in combining and previewing. For example, in an embodiment a sampling segment 124 can be composed of a section of a first, video, source file 115 and a section of a second, audio, source file 115 that are to be combined.

In an embodiment a section of a source file 115 for a sampling segment 124 can be the entire source file 115.

In an embodiment a user 110 can initiate a command 112 for a user preview request to the OFC system 100 via the UI 130 that indicates the sampling segment 124 the user 110 is interested in previewing. In an embodiment the resulting set of preview frames 195 output to the user 110 in response to a user preview request is a preview segment 125 representative of the source frames 185 identified in the corresponding sampling segment 124. In an embodiment a preview segment 125 is composed of one or more preview frames 195 which each correlate to one or more source frames 185 from one or more source files 115.

In an embodiment a user 110 can interact with the UI 130, e.g., send or otherwise initiate commands 112, to modify a preview segment 125. For example, a user 110 can initiate one or more commands 112 via the UI 130 to dictate various treatments, e.g., fade in, fade out, mute audio, add caption(s), generate background(s), etc., to be applied to one or more preview frames 195 of a preview segment 125. As a second example, a user 110 can initiate one or more commands 112 via the UI 130 to reorder the preview frames 195 in a preview segment 125. As still another example, a user can initiate one or more commands 112 via the UI 130 to incorporate a second set of source frames 185, e.g., audio source frames 185, with the existing preview frames 195 of a preview segment 125, e.g., that are composed of video source frames, in order to combine source file segments to, e.g., add a music score to a video.

In an embodiment OFC system 100 a previewer 120 component has the capability to output, i.e., display and/or play, preview segments 125 to a user 110 for the user 110 to view and/or listen to and use to make editing decisions for creating a resultant output file 135. In an embodiment a user 110, via the UI 130, initiates a command 112 composed of a user preview request that results in the previewer 120 outputting a preview segment 125 to the user 110.

As noted, in an embodiment a preview segment 125 has one or more preview frames 195. In an embodiment a preview frame 195 is generated from one or more transcoded, or transposed, i.e., decoded and/or uncompressed, source frames 185. In an embodiment source frames 185 have been encoded and/or compressed using various schemes in order that more data can be stored on the storage media, e.g., the CD, DVD, memory stick, etc. the source file 115 is stored on. In this embodiment the source frames 185 are not meaningful to a user 110; i.e., a user 110 cannot view or listen to these encoded and/or compressed source frames 185 and be able to recognize the subject matter represented therein.

In an embodiment a preview frame 195, pursuant to user commands 112, can have one or more treatments applied thereto. Various treatments that can be applied to one or more preview frames 195 include, but are not limited to, the addition of titles, captions, backgrounds, clipart, etc., fade in or out, colorize, modify to black-and-white, mute, increase volume, etc.

In an embodiment more than one source can contribute to a preview frame 195. For example, a preview frame 195 can be generated by merging an audio source frame 185 with an image source frame 185 so sound is included with an image. As another example, a preview frame 195 can be generated by modifying an image source frame 185, or video source frame 185, to add clip art from a clipart file to the source frame 185. In an embodiment a variety of two or more source combinations can be generated for any preview frame 195.

In an embodiment the preview segment 125 provides the user 110 a view, visual and/or audio, of what a final output file 135 based on the preview segment 125 will be if commanded to be generated from the preview segment 125.

In an embodiment a user 110 can interact with the UI 130, e.g., send or otherwise initiate commands 112, to cause an output file 135 to be generated. In an embodiment an output file 135 is a finalized version of a preview segment 125. In this embodiment once a user 110 is output a preview segment 125 that the user 110 wishes to preserve, the user 110 can initiate a command 112 via the UI 130 for a corresponding output file 135 to be generated and saved.

In an embodiment an output file 135 has one or more output frames 105. In an embodiment one or more output frames 105 are encoded and/or compressed preview frames 195. As indicated, a preview frame 195 is generated from one or more source file frames 185 that, pursuant to user commands 112, can have one or more treatments applied thereto.

In an embodiment one or more output frames 105 are transcoded source frames that are encoded and/or compressed. In an aspect of this embodiment one or more of the transcoded source frames can have one or more treatments applied thereto prior to being encoded and/or compressed as output frames 105. In this embodiment one or more output frames 105 are not generated from any preview frames 195 that were output to a user 110 in a preview segment 125, as further discussed below.

As noted, in an embodiment source frames 185 have been encoded and/or compressed. In an embodiment a media parser 160 component of an OFC system 100 has the capability to transcode, i.e., decode and/or uncompress, source frames 185 to generate counterpart transcoded frames 192 with guidance from an embodiment opportunistic transcoder 150 component of an embodiment OFC system 100. In an embodiment the media parser 160 takes as input one or more source frames 185 of a source file 115 and transcodes one or more source frames 185 so that the resultant transcoded frames 192, when used for preview frames 195 in a preview segment 125 viewed and/or heard by a user 110, are understandable, i.e., recognizable, to the user 110. In an embodiment the media parser 160 stores the generated transcoded frames 192 in a preview file 190 or any other useable data storage component, such as, but not limited to, table, linked list, etc., which are collectively referred to herein as a preview file 190.

In an embodiment the opportunistic transcoder 150 component of an embodiment OFC system 100 has the capability to identify source frames 185 to be transcoded, i.e., decoded and/or uncompressed, in response to a command 112 for a user preview request. In an embodiment the opportunistic transcoder 150 identifies a transcode segment 126 consisting of the source frames 185 to be transcoded to produce a preview segment 125 that can be output to a user 110 for previewing in response to a user preview request.

In an embodiment a transcode segment 126 consists of source frames 185 from one source file 115 and when a user preview request involves more than one source file 185 the opportunistic transcoder 150 identifies a transcode segment 126 for each of the source files 185. In an alternative embodiment a transcode segment 126 consists of source frames 185 from each source file 115 involved in a user preview request.

In an embodiment a transcode segment 126 identified by the opportunistic transcoder 150 consists of consecutive source frames 185 from a start source frame in a source file 115 to an end source frame in a source file 115. In an embodiment a start source frame in a source file 115 for a transcode segment 126 is the first order source frame of the sampling segment 124 for the user's current user preview request. In an embodiment an end source frame in a source file 115 for a transcode segment 126 is the last order source frame of the sampling segment 124 for the user's current user preview request.

In some cases the compression and/or encoding format applied to a source file 115 can require one or more source frames 185 of the source file 115 before the first order source frame of the sampling segment 124 be transcoded in order for the first order source frame(s) of the sampling segment 124 to be correctly transcoded. In some cases the compression and/or encoding format applied to a source file 115 can require one or more source frames 185 of the source file 115 following the last order source frame of the sampling segment 124 be transcoded.

In an embodiment the opportunistic transcoder 150 issues a transcode preview request to the media parser 160 identifying the transcode segment 126 as the target for the media parser 160 transcoding efforts.

As noted, in an embodiment the media parser 160 component of an OFC system 100 has the capability to transcode source frames 185 to generate counterpart transcoded frames 192. In an embodiment, when the media parser 160 receives a transcode preview request from the opportunistic transcoder 150 the media parser 160 will work to transcode one or more of the source frames 185 indicated in the transcode segment 126 identified by, or otherwise associated with, the transcode preview request. In an embodiment the media parser 160 ends transcoding source frames 185 in a transcode segment 126 under one or more predefined conditions.

In an embodiment a first predefined condition for the media parser 160 to end transcoding source frames 185 in a transcode segment 126 is when the media parser 160 has transcoded every source frame 185 in the transcode segment 126.

In an embodiment a second predefined condition for the media parser 160 to end transcoding source frames 185 in a transcode segment 126 is when the media parser 160 has transcoded all the source frames 185 in the transcode segment 126 that will be transcoded. In this embodiment not every source frame 185 of a transcode segment 126 has to be transcoded for the previewer 120 to be able to output an acceptable quality preview segment 125 for user previewing. For example, in an embodiment the media parser 160 only transcodes every other source frame 185 in a transcode segment 126 and the resultant transcoded frames 192, when used for preview frames 195 in a preview segment 125, will provide acceptable output quality for a user 110 to review the preview segment 125 and make intelligent editing decisions thereon.

In an embodiment a third predefined condition for the media parser 160 to end transcoding source frames 185 in a transcode segment 126 is when the media parser 160 receives another transcode preview request from the opportunistic transcoder 150 that identifies a second transcode segment 126 that is different than the transcode segment 126 the media parser 160 is currently processing. In an aspect of this embodiment upon this third predefined condition occurring the media parser 160 finalizes transcoding the source frame.

In an embodiment a fourth predefined condition for the media parser 160 to end transcoding source frames 185 in a transcode segment 126 is when a predetermined time limit expires. In this embodiment the media parser 160 ends processing of a transcode segment 126 after a preset amount of time expires.

In an embodiment a fifth predefined condition for the media parser 160 to end transcoding source frames 185 in a transcode segment 126 is when the media parser 160 has transcoded the last source frame 185 in a source file 115 to be transcoded.

In embodiments other predefined conditions can also, or alternatively, be used to dictate when the media parser 160 ends transcoding source frames 185 in a transcode segment 126 pursuant to a transcode preview request issued from the opportunistic transcoder 150.

In embodiments, because the OFC system 100 is transcoding source frames 185 desired for user previewing the OFC system 100 is saving time and resources that would otherwise be used to transcode source frames 185 a user 110 is not currently interested in. In an embodiment in this manner the user 110 can be provided more robust preview segments 125 more expediently.

In an embodiment the media parser 160 transcodes each consecutive source frame 185 from the start source frame 185 in a transcode preview request that it has time to transcode. In an aspect of this embodiment the opportunistic transcoder 150 is cognizant of the point, i.e., preview frame 195, in the preview segment 125 that is currently being provided, i.e., displayed and/or played, to the user 110 and the next preview frame 195 to be so provided. In this aspect of this embodiment the opportunistic transcoder 150 can determine when a new source frame 185 should be transcoded for a preview segment 125 and whether the media parser 160 has time to perform the transcoding before the counterpart preview frame 195 is to be provided to the user 110. In this aspect of this embodiment when the opportunistic transcoder 150 determines that a source frame 185 for a desired counterpart preview frame 195 has not been transcoded and there is insufficient time for it to be transcoded the opportunistic transcoder 150 communicates with the media parser 160 to command the media parser 160 to skip transcoding the source frame 185. In this aspect of this embodiment by skipping transcoding a source frame 185 the counterpart preview frame 195 will not be part of the current preview segment 125 output to the user 110.

In an embodiment the media parser 160 will then skip to begin transcoding the source frame 185 for the next preview frame 195 following the skipped preview frame 195. For example, assume preview frame three (3) is the next preview frame 195 to be provided to the user 110 but the corresponding source frame 185 has not been transcoded and there is currently insufficient time to transcode it. In this example and embodiment the media parser 160 skips transcoding the counterpart source frame 185 for preview frame three and begins transcoding the source frame 185 for preview frame four (4).

In another embodiment the media parser 160 will skip a predetermined number of source frames 185 to then resume source file frame transcoding for the current transcode preview request. For example, again assume preview frame three (3) is the next preview frame 195 to be provided to the user 110 but the corresponding source frame 185 has not been transcoded and there is currently insufficient time to transcode it. In this example and other embodiment the media parser 160 skips transcoding a predetermined number of source frames 185, e.g., five (5), and begins transcoding the source frame 185 for preview frame eight (8).

In an alternative embodiment when the opportunistic transcoder 150 determines that a source frame 185 for a desired counterpart preview frame 195 has not been transcoded and there is insufficient time for it to be transcoded the opportunistic transcoder 150 identifies a new transcode segment 126 for the current user preview request that has one or more source frames 185 that are chronologically later than the source frame 185 the media parser currently has insufficient time to transcode. In this alternative embodiment the opportunistic transcoder 150 issues a transcode preview request to the media parser 160 identifying the new transcode segment 126 as the target for the media parser 160 transcoding efforts. In this alternative embodiment the media parser 160 will terminate processing the source frame 185 it is currently working to transcode and begin processing the source frames indicated in the new transcode segment 126.

In an embodiment when the media parser 160 transcodes a last source frame 185, e.g., the endpoint source frame 185 for a transcode preview request or the last consecutive source frame 185 in a source file 115, and there is time for the media parser 160 to continue transcoding source frames 185, the media parser 160 continues to transcode source frames 185 that have not yet been transcoded. In an embodiment the media parser 160 can have time to continue transcoding source frames 185 as long as a predefined time limit has not expired and/or the media parser 160 does not receive a new transcode preview request from the opportunistic transcoder 150. In an embodiment the media parser 160 will continue transcoding source frames 185 as long as it has time to do so and there are source frames 185 to transcode.

In an embodiment, with time to continue transcoding source frames 185 in a source file 115 the media parser 160 goes to the first order source frame 185 in the last transcode preview request that the media parser 160 has not previously transcoded and begins transcoding this source frame 185. In this embodiment the media parser 160 continues to transcode consecutive, previously non-transcoded source frames 185 identified in the last transcode preview request that are to be transcoded until a predefined condition is met.

In an embodiment when the media parser 160 finishes transcoding source frames 185 identified in the last transcode preview request and there remains time to continue transcoding source frames 185, the media parser 160 goes to the first order source frame 185 in a prior transcode preview request, e.g., the next-to-last transcode preview request, that the media parser 160 has not previously transcoded and begins transcoding this source frame 185.

In an embodiment the media parser 160 continues to work back through prior transcode preview requests, transcoding previously non-transcoded source frames 185 identified in these prior transcode preview requests until a predefined condition is met. In a second embodiment the media parser 160 continues to work back through prior transcode preview requests, transcoding previously non-transcoded source frames 185 identified in these prior transcode preview requests for a predefined number of transcode preview requests or until a predefined condition is met. In a third embodiment the media parser 160 continues to work back through prior transcode preview requests, transcoding previously non-transcoded source frames 185 identified in these prior transcode preview requests for a predetermined amount of time or until a predefined condition is met. In still other embodiments the media parser 160 continues to work back through prior transcode preview requests, transcoding previously non-transcoded source frames 185 identified in these prior transcode preview requests until other conditions and/or combinations of conditions are met.

In an embodiment, if the media parser 160 transcodes the source frames 185 identified in all prior transcode preview requests for a current user editing session, i.e., a current user access time with the OFC system 100, and still has time to continue to transcode source frames 185 then the media parser 160 goes to the first source frame 185 in a source file 115 that has not been transcoded and begins transcoding this source frame 185. The media parser 160 will thereafter continue to transcode previously non-transcoded source frames 185 in the source file 115 until there are no more source frames 185 to transcode in the source file 115 or another predefined condition is met.

In an aspect of this embodiment the media parser 160 begins transcoding source frames 185 in the source file 115 that it was last currently processing. In other aspects of this embodiment the media parser 160 begins transcoding source frames 185 in a source file 115 determined by other criteria such as, but not limited to, the source file 115 from which the largest number of sampling segments 124 for the current user editing session are generated, the source file 115 from which the greatest number of source frames 185 for each sampling segment 124 identified in the current user editing session originate, etc.

In an alternative embodiment when the media parser 160 finishes transcoding source frames 185 identified in the last transcode preview request and there remains time to continue transcoding source frames 185, the media parser 160 goes to the first source frame 185 in the current source file 115 that the media parser 160 has been processing and begins transcoding this source frame 185. In this alternative embodiment the media parser 160 continues to transcode consecutive, previously non-transcoded source frames 185 in the current source file 115 until a predefined condition is met.

In other alternative embodiments when the media parser 160 finishes transcoding source frames 185 identified in the last transcode preview request and there remains time to continue transcoding source frames 185, the media parser 160 begins transcoding source frames 185 in a source file 115 determined by other criteria. In these other alternative embodiments other criteria can include, but are not limited to, the source file 115 from which the largest number of sampling segments 124 for the current user editing session are generated, the source file 115 from which the greatest number of source frames 185 for each sampling segment 124 identified in the current user editing session originate, etc.

In an embodiment when the media parser 160 finishes transcoding source frames 185 in a source file 115 and there remains time to continue transcoding source frames 185, the media parser 160 begins transcoding source frames 185 in another source file 115. In this embodiment the media parser 160 continues to transcode source frames 185 in each source file 115 as long as it has time to and there are source frames 185 to transcode. In aspects of this embodiment the order of the source files 115 that the media parser 160 works to transcode source frames 185 from is determined by various criteria including, but not limited to, from the source file 115 from which the largest number of sampling segments 124 for the current user editing session are generated to the source file 115 from which the smallest, or no, number of sampling segments 124 are generated, from the source file 115 from which the greatest number of source frames 185 for each sampling segment 124 defined in the current user editing session originated to the source file 115 from which the smallest, or no, number of source frames 185 for each sampling segment 124 originated, etc.

In an aspect of this embodiment the media parser 160, when and if or as time permits, transcodes every source frame 185 of each source file 115. In another aspect of this embodiment the media parser 160, when and if or as time permits, transcodes a sufficient number of source frames 185 of each source file 115 for any preview segment 125 to be generated and user recognizable, i.e., of sufficient output quality for user previewing. In this other aspect of this embodiment not all source frames 185 of any source file 115 have to be transcoded for any potential preview segment 125 derived from one or more of the source files 115 to be user recognizable.

In an embodiment the opportunistic transcoder 150 has the capability to be cognizant of the current preview segment 125 to be, or is being, provided to the user 110, i.e., the set of preview frames 195 in the requested order, with any treatment applied thereto, that the user 110 currently wishes to preview. There can be instances where a user 110 will preview the same set of transcoded frames 192 established as preview frames 195 more than once as they work on their current or a subsequent editing project. Thus in an embodiment transcoded frames 192 can already exist and be ready for inclusion in a preview segment 125 when a user 110 issues a command 112 for a user preview via the UI 130. In this embodiment the opportunistic transcoder 150 need not command the media parser 160 to transcode a source frame 185 for which the counterpart transcoded frame 192 has already been generated and stored in a preview file 190.

In an embodiment there can be missing preview frames 195 for a preview segment 125 that were not generated because there was previously insufficient time for their counterpart source frames 185 to be transcoded. In an embodiment, upon a user 110 issuing a user preview request the opportunistic transcoder 150 determines which, if any, preview frames 195 for the preview segment 125 already exist and which, if any, transcoded frames 192 for the preview segment 125 already exist. In this embodiment the opportunistic transcoder 150 commands the media parser 160 to transcode only those source frames 185 for which a desired preview frame 195 has not already been generated and a counterpart transcoded frame 192 does not currently exist. In this manner the OFC system 100 can provide a more time efficient preview session to a user 110 for each subsequent user preview request that involves prior generated preview frames 195 as there is less, or potentially no, time used for generating the desired preview frames 195. Also in this manner the embodiment OFC system 100 can provide subsequently richer previews to a user 110 over time as each time a preview segment 125 that has existing preview frames 195 and/or is generated from currently existing transcoded frames 192 is output to a user 110 additional preview frames 195 may be timely generated and included therewith.

In an embodiment the media parser 160 transcodes less than all source frames 185 of a source file 115 for a transcode segment 126 identified in a first transcode preview request even when the media parser 160 has time to transcode additional source frames 185. For example, in an embodiment the media parser 160 transcodes every other source frame 185 in a transcode segment 126 pursuant to a first transcode preview request issued from the opportunistic transcoder 150. In an embodiment if the media parser 160 receives a second transcode preview request for the same transcode segment 126 or a transcode segment 126 that overlaps with a prior transcode segment 126 then the media parser 160 transcodes those source frames 185 of the transcode segment 126 that were not previously transcoded. In this embodiment the media parser 160 does not re-transcode source frames 185 that were previously transcoded.

In an alternative embodiment the media parser 160 transcodes only a subset portion of source frames 185 of any source file 115 no matter how much time the media parser 160 has to transcode additional source frames 185, unless otherwise directed. For example, in this alternative embodiment the media parser 160 only transcodes every other source frame 185 of any source file 115 no matter how much time the media parser 160 has to work to transcode every source frame 185 of any source file 115, unless otherwise directed. In this alternative embodiment the media parser 160 works, as time permits, to transcode the source frames 185 that, if the basis for any preview frame 195 in any potential preview segment 125, can provide an acceptable quality preview segment 125 for user previewing.

As noted, in an embodiment the media parser 160 stores the generated transcoded frames 192 in a preview file 190. In embodiments the preview file 190 is in volatile or non-volatile memory, and thus is available for the current user editing session and, in embodiments, subsequent user editing sessions.

In an embodiment transcoded frames 192 are stored in the order they are generated and an index is established for the OFC system 100 to map between a source frame 185 and a counterpart transcoded frame 192. In this embodiment the OFC system 100 uses the established index to determine whether a transcoded frame 192 is available to be provided to a user 110 in a preview segment 125.

In an alternative embodiment transcoded frames 192 are stored in the same order as their counterpart source frames 185 with a one-to-one correspondence. In an aspect of this embodiment an empty frame in the preview file 190 indicates that the corresponding source frame 185 has not been transcoded. An empty frame in a preview file 190 can be indicated with a variety of mechanisms in various embodiments including, but not limited to, a predefined, empty, data pattern, e.g., all zeros, a flag associated with each frame of the preview file 190 that indicates whether the frame of the preview file 190 is empty or populated, etc.

In other embodiments the organization of the transcoded frames 192 in a preview file 190 can be in other orders with various addressing schemes, with or without a one-to-one correspondence with any source file 115. Exemplary alternative embodiment preview file 190 organizations include the order of the counterpart source frames 185 without a one-to-one correspondence so there are no empty frames in the preview file 190, the order of the counterpart preview frames 195 for a preview segment 125, etc.

In an embodiment a compositor 140 component of the OFC system 100 has the capability to generate preview segments 125 to be output to a user 110. An embodiment compositor 140 combines one or more transcoded frames 192 into one or more preview segments 125. In an embodiment the compositor 140, from user commands 112 via the UI 130, applies treatments, e.g., visual and/or audio effects, to one or more transcoded frames 192 that are then included as preview frames 195 in a preview segment 125 output to a user 110.

In an embodiment a previewer component 120 of the OFC system 100 has the capability to output preview segments 125 to a user 110.

In an embodiment a user 110 can issue a command 112 for a user preview request for one or more source files 115 via the UI 130 that indicates a user requested sampling segment. In an embodiment in response to the user preview request the compositor 140 sends the opportunistic transcoder 150 a previewing request.

In an embodiment when the media parser 160 transcodes a sufficient number of source frames 185 for the transcode segment 126 the media parser 160 notifies the opportunistic transcoder 150, which, in turn, notifies the compositor 140 that source frames 185 for the preview segment 125 are available. In an embodiment the compositor 140 generates a first preview segment 125 in response to an initial user preview request by combining all currently existing transcoded frames 192 from the preview file 190 for the preview segment 125.

In an embodiment the compositor 140 generates a first preview segment 125 in response to an initial user preview request by combining transcoded frames 192 in the same chronological order as the corresponding source frames 185.

In an embodiment when a user 110 makes a subsequent request for the same preview segment 125 the compositor 140 generates a new preview segment 125, or alternatively modifies the current preview segment 125, adding transcoded frames 192 for the preview segment 125 that have since become available, i.e., have been transcoded since the current preview segment 125 was first produced. In this manner the embodiment OFC system 100 can dynamically and opportunistically provide increasingly robust preview segments 125 to a user 110.

In an embodiment the OFC system 100 maintains a decision list 122 that records editing decisions a user 110 makes for one or more source frames 185. The decision list 122 can be in any of various formats, including but not limited to, a list, a table, etc., collectively referred to herein as a decision list 122. In an embodiment the decision list 122 indicates which preview frames 195 were last provided to the user 110. In an embodiment the decision list 122 identifies the source frames 185 of the user requested sampling segment that correspond with the current preview segment 125 output to the user 110. In this embodiment, even if one or more transcoded frames 192 do not exist for a preview segment 125 the OFC system 100 is cognizant of the corresponding source frames 185 that would have been represented by their counterpart transcoded frames 192 as preview frames 195 if they had been transcoded.

In an embodiment the previewer 120 maintains the decision list 122 for the OFC system 100. In an alternative embodiment the compositor 140 maintains the decision list 122 for the OFC system 100. In other alternative embodiments other components of the OFC system 100 or combinations of components of the OFC system 100 maintain the decision list 122 for the OFC system 100.

A user 110 can alter the order of source frames 185 from a source file 115 for a desired output file 135. A user 110 can combine source frames 185 from two or more source files 115 for a desired output file 135. In an embodiment these user editing requests can be demonstrated to the user 110 in a preview segment 125 provided to the user 110. In an embodiment the decision list 122 identifies the order of preview frames 195 included in a preview segment 125. In an embodiment the decision list 122 identifies the source file(s) 115 that each preview frame 195 was derived from.

In an embodiment a user 110 can request one or more treatments, e.g., fade in, fade out, include clip art, rotate, etc., be applied to one or more source frames 185. In an embodiment the decision list 122 identifies each treatment applied to a transcoded frame 192 for a corresponding preview frame 195 provided to the user 110 in a preview segment 125.

In embodiments the decision list 122 contains alternative and/or additional elements relevant to generating an output file 135 from one or more source files 115.

In an embodiment as a user 110 issues editing commands 112 via the UI 130 the compositor 140 performs the corresponding actions on a preview segment 125 which is then output to the user 110. In an embodiment, per user commands 112, the compositor 140 reorders, adds, or deletes preview frames 195 for a preview segment 125. In an embodiment, per user commands 112, the compositor 140 applies treatments to one or more transcoded frames 192 and/or one or more preview frames 195 the result of which are included in a preview segment 125 output to the user 110.

In an embodiment the compositor 140 continues to generate, and regenerate or modify, preview segments 125 pursuant to user commands 112 while the user 110 previews one or more source files 115. In an embodiment the decision list 122 is updated accordingly.

As noted, in embodiments a preview segment 125 may not contain every consecutive preview frame 195 for the corresponding transcode segment 126, or user requested sampling segment. Thus, in an embodiment, whether or not a preview segment 125 contains reordered and/or treated preview frames 195, not all preview frames 195 for the corresponding user requested sampling segment may be included in the preview segment 125 output to the user 110. In an embodiment this may be because one or more preview frames 195 were not generated from their source frame 185 counterpart(s), e.g., the media parser 160 only transcodes a subset, such as every other source frame 185, of a transcode segment 126 for a user preview request. In an embodiment this can also, or alternatively, be because at the time the preview segment 125 is provided to the user 110 the media parser 160 had insufficient time to transcode one or more source frames 185 the result of which would have been included as preview frames 195 in the preview segment 125.

In an embodiment OFC system 100 an encoder 170 component has the capability to generate an output file 135 that is the result of a user's editing commands 112 for one or more source files 115. An embodiment encoder 170 uses the decision list 122, one or more transcoded frames 192, the index associated with the preview file 190, if it exists and where applicable, the most current preview segment 125 and its preview frames 195, and/or one or more source frames 185 to generate a final output file, or files, 135. In other embodiments the encoder 170 can use other information and/or elements in generating an output file 135.

In an embodiment the encoder 170 writes the output file(s) 135 in one or more predetermined formats and/or one or more user-specified formats and/or one or more conforming formats for one or more output devices connected to or otherwise in communication with the computing device 180 upon which the OFC system 100 is operating.

In an embodiment an output file 135 has one or more output frames 105. In an embodiment an output frame 105 is a source frame 185, or combination of source frames 185, from one or more source files 115 that may or may not have been modified, i.e., treated. In an embodiment an output frame 105 can be generated from a transcoded frame 192 or a preview frame 195.

In an embodiment output frames 105 are encoded and/or compressed. In an aspect of this embodiment the output frames 105 of an output file 135 are encoded using a different encoding scheme than the encoding scheme used to encode the counterpart source frames 185 in the original source file(s) 115 from which the output file 135 is derived.

In an embodiment source frames 185 associated with output frames 105 of an output file 135 can originate from one or more source files 115. Thus, for example, in an embodiment an output file 135 can have output frames 105 from, or derived from, a first, video, source file 115 and output frames 105 from, or derived from, a second, audio, source file 115. As another example, in an embodiment an output file 135 can have output frames 105 from, or derived from, a first, video, source file 115 and from, or derived from, a second, audio, source file 115.

Figure 2A:
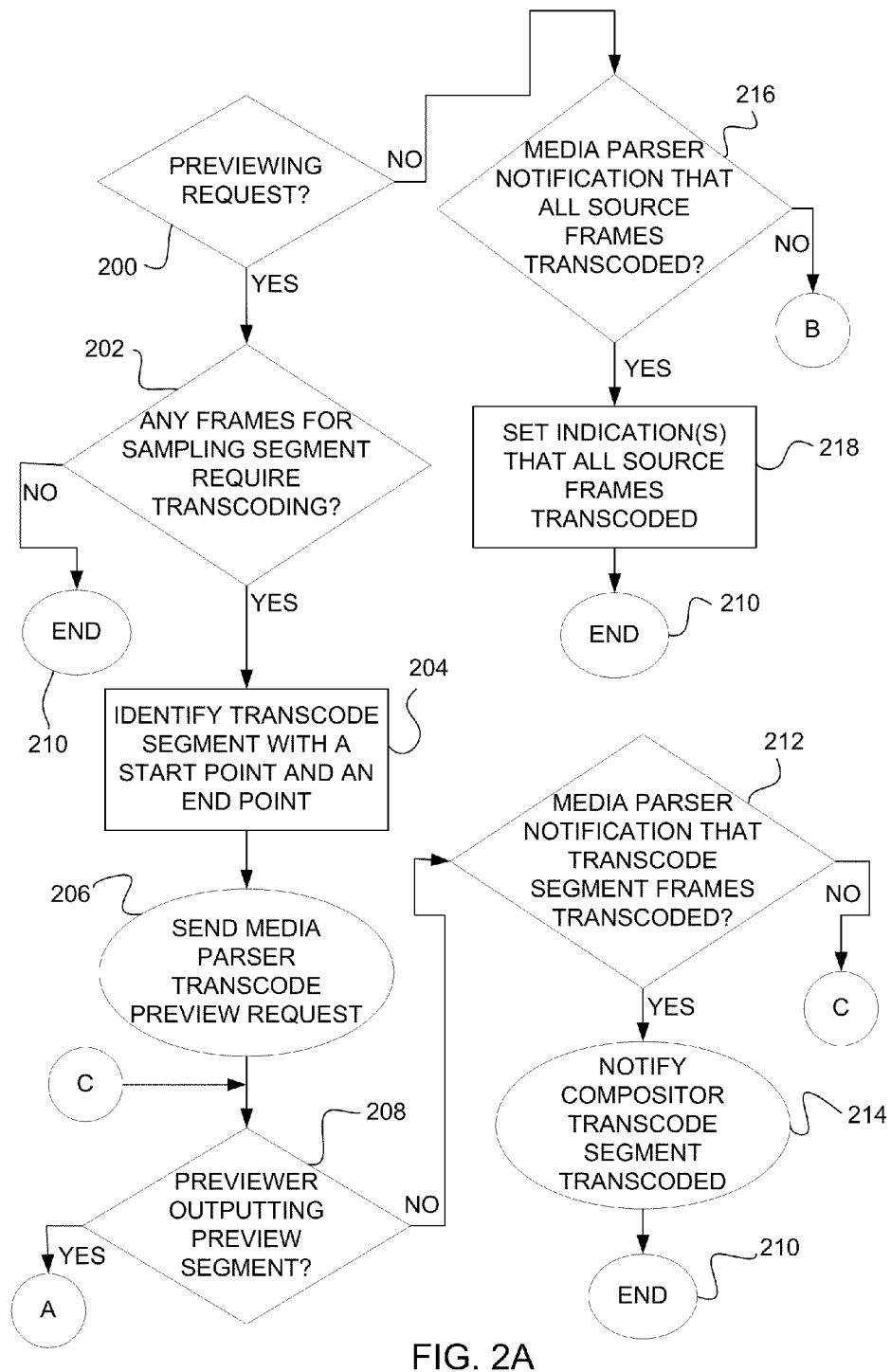
FIGS. 2A-2C illustrate an embodiment logic flow for an embodiment opportunistic transcoder component of an opportunistic frame cache system.
Figure 2B:
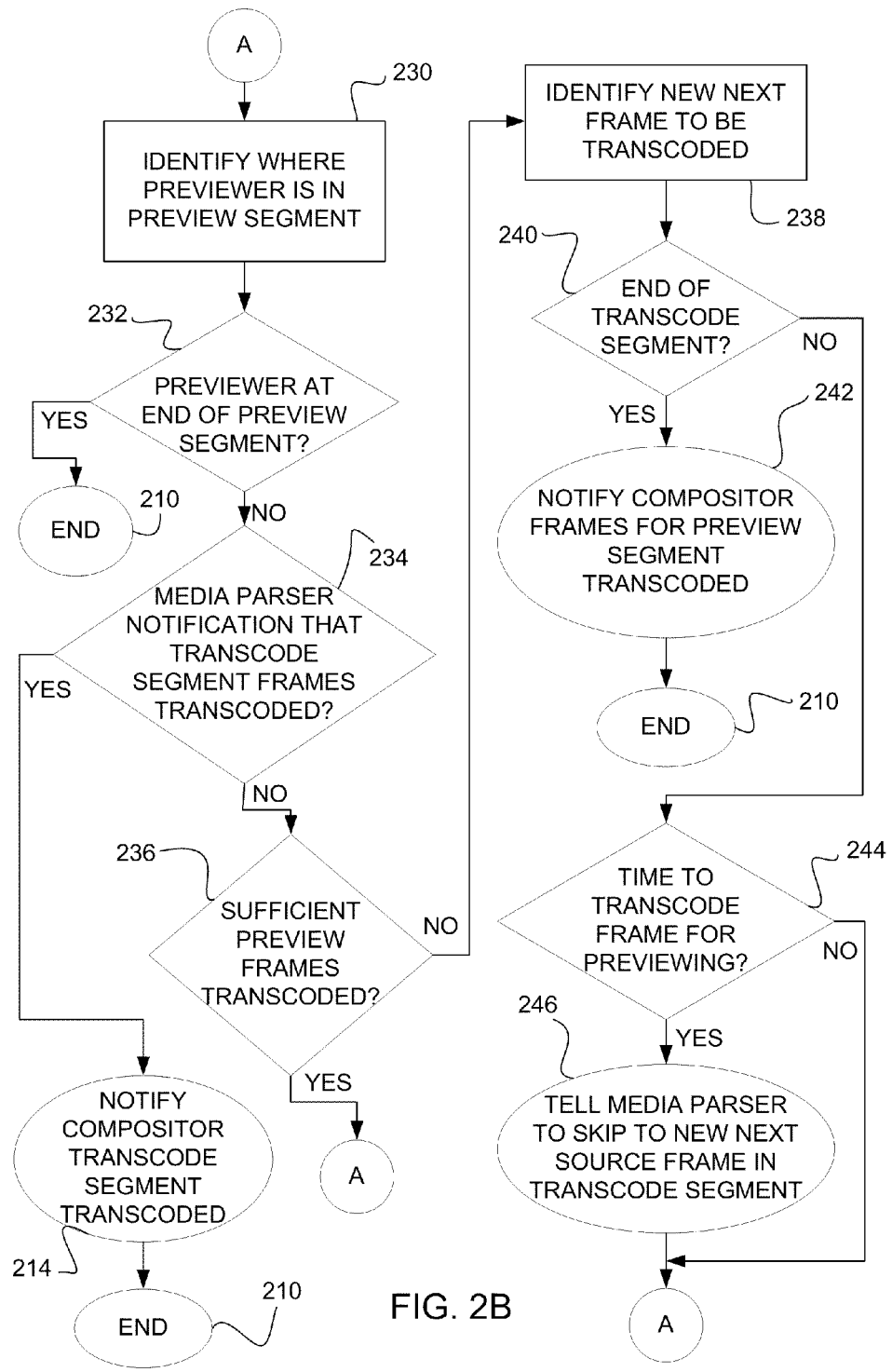
Figure 2C:
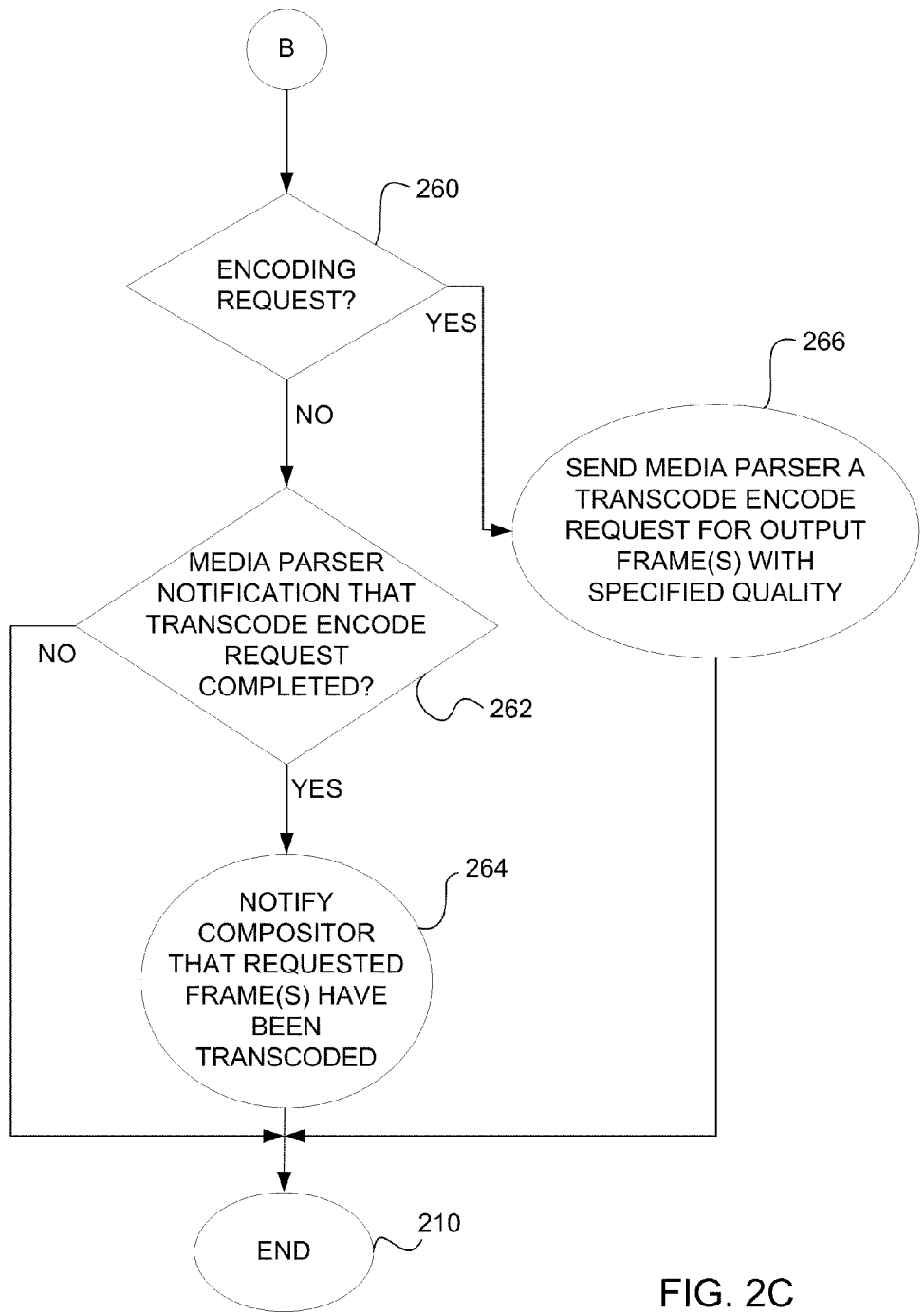

FIGS. 2A-2C illustrate an embodiment logic flow for an embodiment opportunistic transcoder 150 component of an OFC system 100. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment opportunistic transcoder 150, an embodiment opportunistic transcoder 150 in combination with one or more other OFC system components, or by one or more other OFC system components.

Referring to FIG. 2A, in an embodiment at decision block 200 a determination is made as to whether the opportunistic transcoder has received a previewing request, or command; i.e., whether the opportunistic transcoder has been notified by, e.g., the compositor that a preview segment is to be generated and output to a user. If yes, at decision block 202 a determination is made as to whether any source frames for the sampling segment indicated by the user have not yet been transcoded. If no, meaning in an embodiment all the source frames in the transcode segment corresponding to the user requested sampling segment have been transcoded, in an embodiment the opportunistic transcoder ends processing 210.

If no at decision block 202, meaning in a second embodiment that all the source frames in the transcode segment corresponding to the user requested sampling segment that will be transcoded have been transcoded, in an embodiment the opportunistic transcoder ends processing 210. In this second embodiment the media parser 160 only ever transcodes a subset of the source frames 185 of the one or more source files 115 for user previewing as no preview segment 125 requires all respective source frames 185 to be transcoded and subsequently included in a preview segment 125 to provide adequate output preview quality to the user 110.

If at decision block 202 there are one or more source frames for the user requested sampling segment that have not been transcoded and in an embodiment the source frames will be transcoded by the media parser if time permits, then in an embodiment the opportunistic transcoder identifies a transcode segment 204 with a start point, i.e., first source frame, and an end point, i.e., last source frame.

In an embodiment the first source frame may be the first chronological source frame 185 in a source file 115 for the current user requested sampling segment 124.

In an embodiment the first source frame may be the first chronological source frame 185 in a source file 115 that is to be transcoded if all the source frames 185 in the user requested sampling segment 124 are to be correctly transcoded.

In an embodiment the first source frame may be the first chronological source frame 185 in a source file 115 for the user requested sampling segment 124 that has not previously been transcoded. In this embodiment one or more source frames 185 in the user requested sampling segment 124 were transcoded for a prior user preview request or when the media parser 160 had time to transcode them.

In an embodiment the first source frame may be a source frame 185 the opportunistic transcoder 150 identifies as the source frame 185 of the source file 115 the media parser 160 is to begin transcoding for the current sampling segment 124, e.g., the second chronological source frame in a source file 115 for the user requested sampling segment 124, the fifth chronological source frame in the source file 115 for the sampling segment 124, etc.

In an embodiment the opportunistic transcoder sends the media parser a transcode preview request 206. In an embodiment the transcode preview request indicates, or otherwise identifies or is associated with, the transcode segment the media parser is to transcode 206.

In an embodiment at decision block 208 a determination is made as to whether the previewer is currently outputting a preview segment for the corresponding user preview request. In this embodiment there may be sufficient preview frames 195 or transcoded frames 192 for the compositor 140 to generate a preview segment 125 that the previewer 120 can output to the user 115 but not all the preview frames 195 and/or transcoded frames 192 for generating a complete preview segment 125.

If at decision block 208 the previewer is not currently outputting a preview segment then in an embodiment at decision block 212 a determination is made as to whether the media parser has provided a notification that the source frames for the transcode segment for the current user preview request that will be transcoded have been transcoded. If yes, in an embodiment the opportunistic transcoder notifies the compositor that the source frames that will be transcoded for the current user preview request have been transcoded 214. In an embodiment the opportunistic transcoder ends processing 210.

If at decision block 212 there has been no media parser notification that the source frames for the transcode segment for the current user preview request that will be transcoded have been transcoded then in an embodiment the opportunistic transcoder again determines whether or not the previewer is currently outputting a preview segment for a corresponding user preview request 208.

If at decision block 208 the previewer is currently outputting a preview segment for a corresponding user preview request then, referring to FIG. 2B, in an embodiment the opportunistic transcoder identifies, or otherwise keeps track of, where, e.g., which preview frame, or preview frame range, the previewer is in outputting to the user and the user is currently previewing 230. In an embodiment the opportunistic transcoder 150 communicates with the compositor 140 to remain apprised of what preview frame 195, or preview frame section, in the preview segment 125 the previewer 120 is outputting to a user 110. In an alternative embodiment the opportunistic transcoder 150 communicates with the previewer 120 to remain apprised of where in the preview segment 125 the user 110 is currently previewing, i.e., reviewing and/or editing. In an embodiment the opportunistic transcoder 150 can refer to one or more data storage elements, e.g., a table, a set of flags, etc., to identify the current preview frame 195, or preview frame section, the previewer 120 is outputting to a user 110.

In an embodiment at decision block 232 a determination is made as to whether the previewer is at the end of the current preview segment; i.e., has the previewer output the entire current preview segment to the user. If yes, in an embodiment the opportunistic transcoder ends processing 210.

If the previewer is not at the end of the current preview segment, in an embodiment at decision block 234 a determination is made as to whether the media parser has provided a notification that the source frames for the transcode segment for the current user preview request that will be transcoded have been transcoded. If yes, in an embodiment the opportunistic transcoder notifies the compositor that the source frames that will be transcoded for the current user preview request have been transcoded 214. In an embodiment the opportunistic transcoder then ends processing 210.

If at decision block 234 there has been no media parser notification that the source frames for the transcode segment for the current user preview request that will be transcoded have been transcoded then in an embodiment at decision block 236 a determination is made as to whether sufficient preview frames exist to support where the previewer is in outputting the preview segment to the user. If yes, in an embodiment the opportunistic transcoder identifies which preview frame, or frame range, the previewer is currently outputting to the user 230.

If at decision block 236 there are insufficient preview frames available to support where the previewer is in outputting the preview segment to the user in an embodiment the media parser is behind in transcoding source frames for the current user preview request. If at decision block 236 there are insufficient preview frames available then in an embodiment the opportunistic transcoder identifies a new next source frame in the transcode segment for the current user preview request for transcoding 238.

In an embodiment the identified new next source frame in the transcode segment 126 is a source frame 185 chronologically later in the source file 115 than the source frame 185 the media parser 160 is, or is about to, transcode. In an embodiment the identified new next source frame can be the next chronological source frame 185 in the source file 115 from the source frame 185 the media parser 160 is, or is about to, transcode. In an alternative embodiment the identified new next source frame can be a predetermined or calculated number of source frames 185 chronologically later in the source file 115 than the source frame 185 the media parser 160 is, or is about to, transcode in order to provide the media parser 160 adequate time to transcode a source frame 185 for a needed preview segment 125

In an embodiment at decision block 240 a determination is made as to whether the opportunistic transcoder is at the end of the transcode segment; i.e., whether or not there are any more source frames in the transcode segment to identify to the media parser for transcoding at this time. If the opportunistic transcoder is at the end of the transcode segment then in an embodiment the opportunistic transcoder notifies the compositor that source frames for the preview segment for the current user preview request have been transcoded 242. In an embodiment the opportunistic transcoder ends processing 210.

If at decision block 240 the opportunistic transcoder is not at the end of the transcode segment in an embodiment at decision block 244 a determination is made as to whether there is adequate time for the media parser to transcode the new next source frame in the transcode segment for the current user preview request. If there is adequate time in an embodiment the opportunistic transcoder commands, or otherwise signals, the media parser to skip to the identified new next source frame in the transcode segment and work to transcode source frames of the transcode segment from this source frame 246.

Whether or not at decision block 240 there is adequate time for the media parser to transcode the identified new next source frame in the transcode segment in an embodiment the opportunistic transcoder identifies, or otherwise keeps track of, where, e.g., which preview frame, or preview frame range, the previewer is in outputting to the user and the user is currently previewing 230.

Referring back to FIG. 2A, if at decision block 200 the opportunistic transcoder has not received a previewing request then in an embodiment at decision block 216 a determination is made as to whether the opportunistic transcoder has received a notification from the media parser that all source frames of the source file(s) have been transcoded. In an embodiment all source frames 185 of the source file(s) 115 is every source frame 185 within each source file 115. In an alternative embodiment all source frames 185 of the source file(s) 115 is a subset of the source frames 185 of each source file 115 that when transcoded is adequate to generate an acceptable preview segment 125 for any user preview request.

If at decision block 216 the media parser has indicated that all source frames of the source file(s) are transcoded, in an embodiment the opportunistic transcoder sets one or more indications, e.g., flags, table entries, etc., to indicate that all source frames of the source file(s) are transcoded 218. In an embodiment the opportunistic transcoder ends processing 210.

If at decision block 216 the media parser has not indicated that all source frames of the source file(s) have been transcoded then, referring to FIG. 2C, in an embodiment at decision block 260 a determination is made as to whether the compositor has sent an encoding request to the opportunistic transcoder; i.e., whether the compositor has requested that one or more source frames be transcoded for an output file. If yes, in an embodiment the opportunistic transcoder sends the media parser a transcode encode request, or command, to transcode one or more source frames with a specified, or predefined, quality 266. In an embodiment the opportunistic transcoder ends processing 210.

If at decision block 260 the compositor has not issued an encoding request then in an embodiment at decision block 262 a determination is made as to whether the media parser has provided a notification that the prior issued transcode encode request has been completed; i.e., the media parser has transcoded requested source frames for an output file. If yes, in an embodiment the opportunistic transcoder notifies the compositor that the source frames requested to be transcoded for an output file have been transcoded 264. In an embodiment the opportunistic transcoder ends processing 210.

If at decision block 262 the media parser has not provided a notification that the outstanding transcode encode request has been completed in an embodiment the opportunistic transcoder ends processing 210.

Figure 3A:
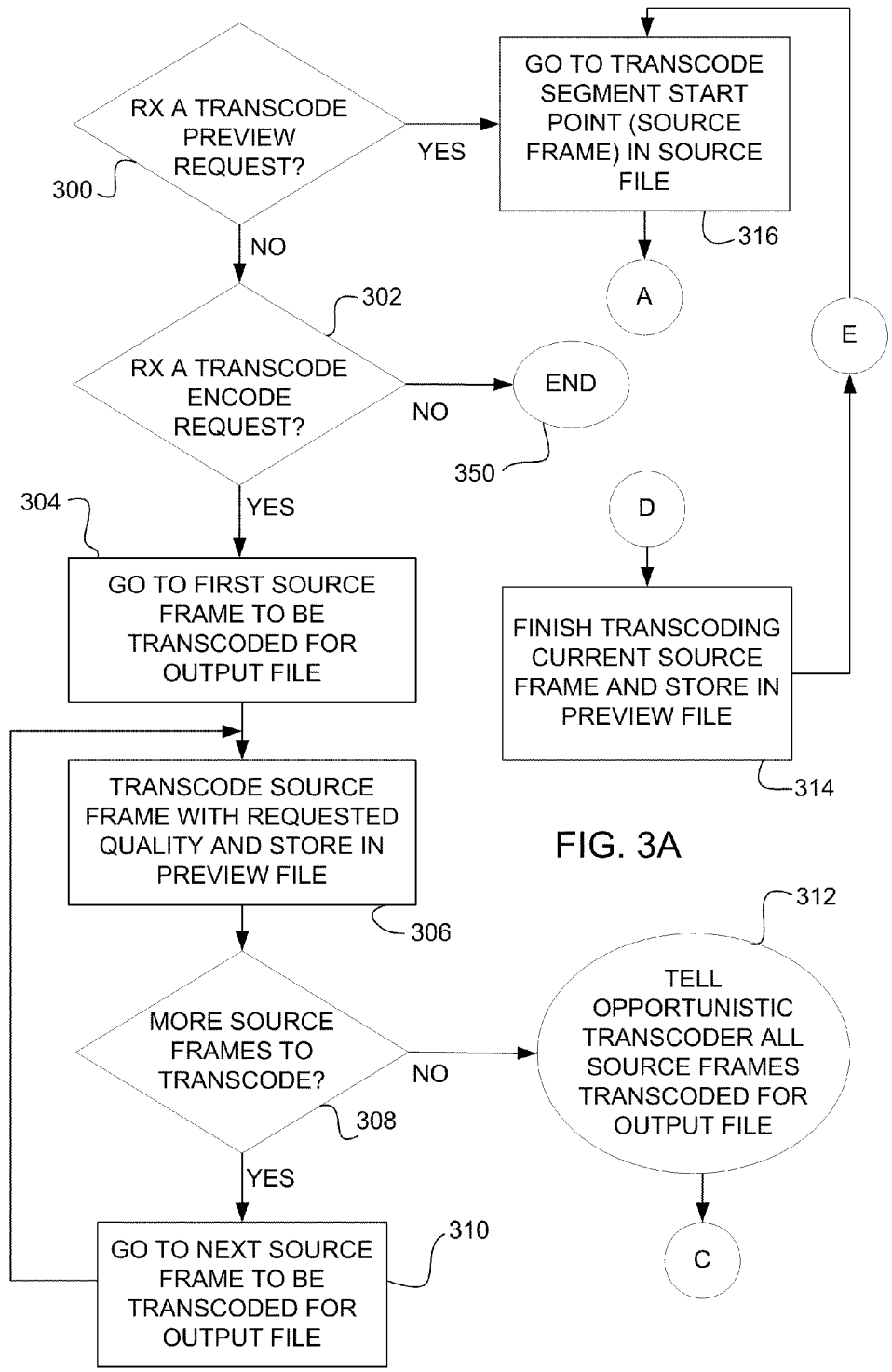
FIGS. 3A-3C illustrate an embodiment logic flow for an embodiment media parser component of an opportunistic frame cache system.
Figure 3B:
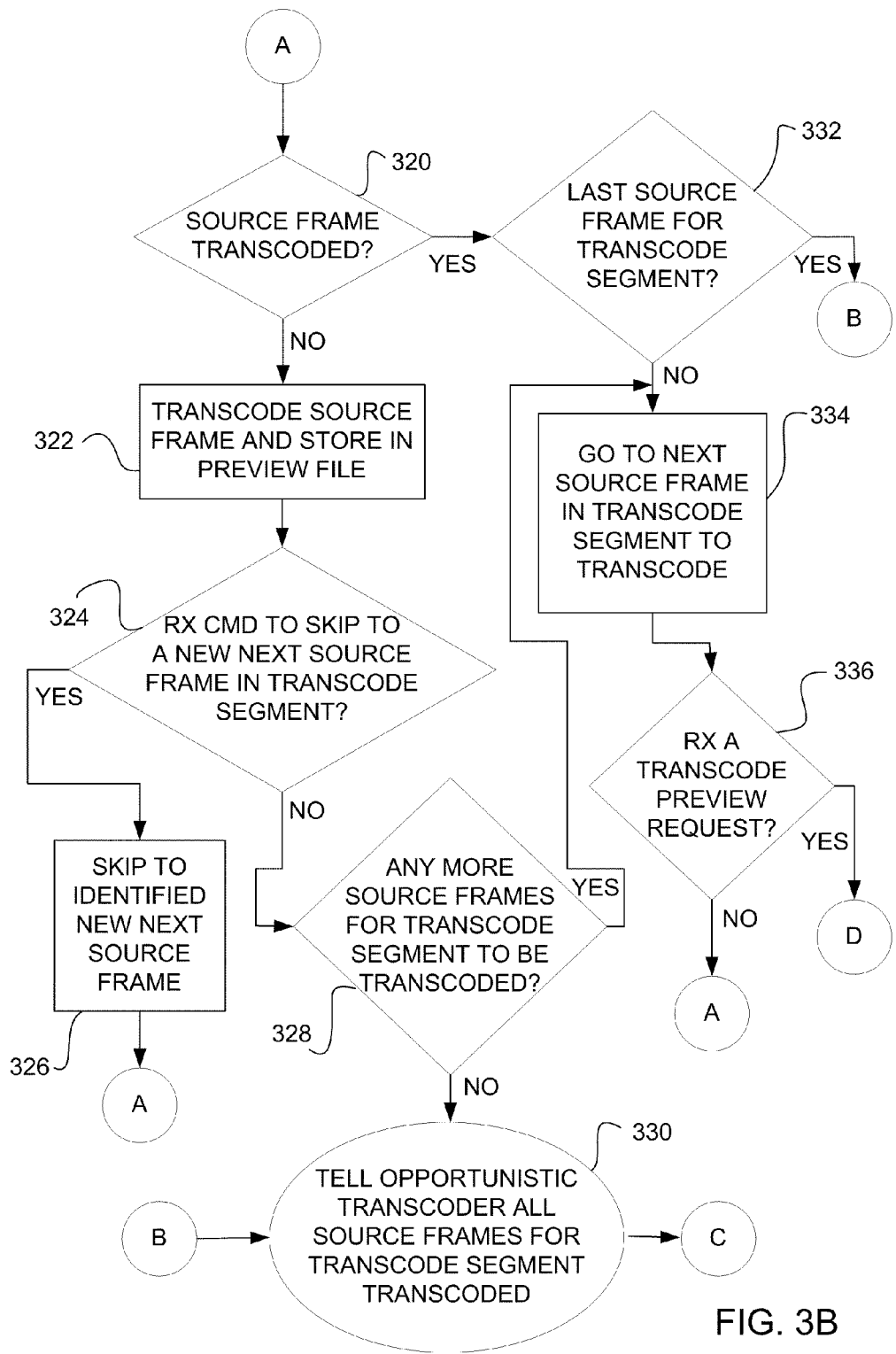
Figure 3C:
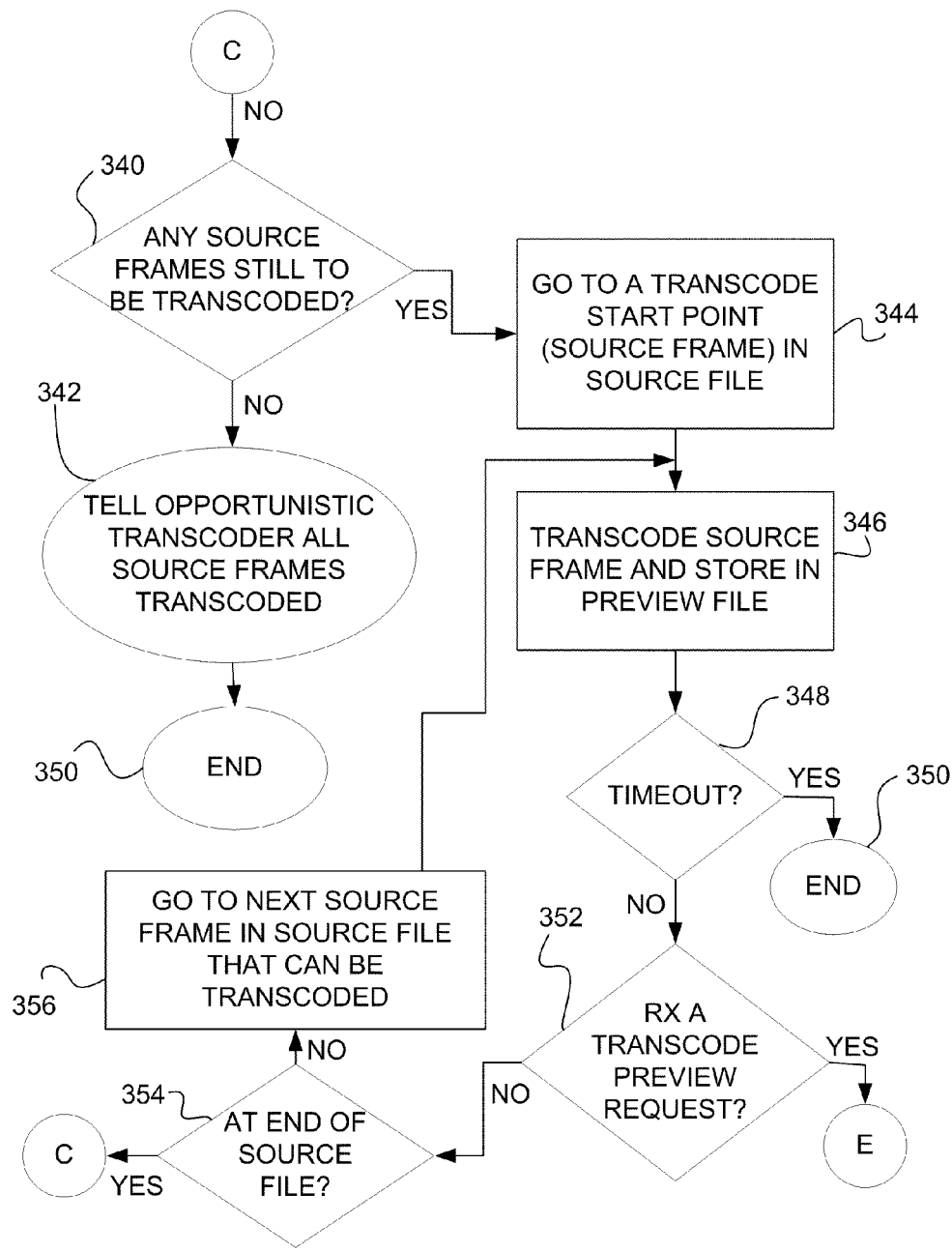

FIGS. 3A-3C illustrate an embodiment logic flow for an embodiment media parser 160 component of an OFC system 100. While the following discussion is made with respect to systems portrayed herein the operations described may be implemented in other systems.

Referring to FIG. 3A, in an embodiment at decision block 300 a determination is made as to whether the media parser has received a transcode preview request from the opportunistic transcoder; i.e., whether the media parser has been requested to transcode source frames from one or more source files for a preview segment to be output to a user. If yes, in an embodiment the media parser goes to the start source frame, also referred to as the current source frame, in the transcode segment 316.

Referring to FIG. 3B, at decision block 320 a determination is made as to whether the current source frame has already been transcoded. If yes, in an embodiment at decision block 332 a determination is made as to whether the current source frame is the last source frame for the current transcode preview request; i.e., whether or not there are any more source frames to be transcoded for the current preview segment to be output to the user. If the current source frame is the last source frame then in an embodiment the media parser notifies the opportunistic transcoder that all source frames for the current transcode segment corresponding to the current user requested sampling segment that will be transcoded have been transcoded 330.

Referring to FIG. 3C, in an embodiment if all source frames for the current preview segment that will be transcoded have been transcoded then in an embodiment at decision block 340 a determination is made as to whether there are any source frames in a source file still to be transcoded. In an embodiment any source frames 185 still to be transcoded means there is at least one source frame 185 in a source file 115 that has not been transcoded. In another embodiment any source frames 185 still to be transcoded means at least one source frame 185 of a subset of source frames 185 of the source files 115, that if all of the subset of source frames are transcoded support generating an acceptable preview segment 125 for any user preview request, has not yet been transcoded.

If at decision block 340 there are no source frames to be transcoded, in an embodiment the media parser notifies the opportunistic transcoder that all source frames that will be transcoded have been transcoded 342. In an embodiment the media parser ends processing 350.

If at decision block 340 there are source frames to transcode then in an embodiment the media parser identifies a transcode start point, i.e., start source frame, in a source file to begin transcoding 344. In an embodiment the start source frame is the first source frame 185 from the beginning of the source file 115 the media parser 160 has currently been processing that has yet to be transcoded. In a second embodiment the start source frame is a source frame 185 identified by the media parser 160 as a potential source frame 185, if transcoded, for a user requested sampling segment 124, e.g., a source frame 185 ten source frames 185 earlier than the start source frame of the last user requested sampling segment 124, the source frame 185 immediately following the last chronological source frame 185 of the last user requested sampling segment 124, etc. In a third embodiment the start source frame is a source frame 185 that was not transcoded for a prior user requested sampling segment 124. In other alternative embodiments the start source frame can be other identified source frames 185.

In an embodiment the media parser transcodes the start source frame and stores the resultant transcoded frame in a preview file 346.

In an embodiment at decision block 348 a determination is made as to whether there is a timeout; i.e., whether or not a predetermined time limit for the media parser to transcode source frames has expired. If yes, in an embodiment the media parser ends processing 350.

In no timeout at decision block 348 then in an embodiment at decision block 352 a determination is made as to whether the media parser has received a transcode preview request from the opportunistic transcoder. If no, then in an embodiment at decision block 354 a determination is made as to whether the media parser is at the end of the source file it is currently processing. If no, in an embodiment the media parser identifies a next source frame in the source file to transcode 356 and transcodes this new next source frame and stores the resultant transcoded frame in the preview file 346.

If at decision block 354 the media parser is at the end of the source file it is currently processing then in an embodiment at decision block 340 a determination is made as to whether there are any source frames still to be transcoded.

If at decision block 352 the media parser has received a transcode preview request then in an embodiment, and referring back to FIG. 3A, the media parser goes to, or otherwise identifies, the start source frame, also referred to as current source frame, in the source file for the new transcode preview request 316.

Referring again to FIG. 3B, if at decision block 320 the current source frame in the transcode segment has not already been transcoded then the current source frame is transcoded and the resultant transcoded frame is stored in a preview file 322.

In an embodiment at decision block 324 a determination is made as to whether the media parser has received a command, or notification, from the opportunistic transcoder to skip to a new next source frame in the transcode segment. In an embodiment the media parser 160 may be instructed to skip to a new next source frame 185 in the transcode segment 126 to support the previewer 120 in outputting a preview segment 125 to the user 110.

If at decision block 324 the media parser has been instructed to skip to a new next source frame in the transcode segment then in an embodiment the media parser skips to the identified new next source frame 326 and, at decision block 320, determines whether this new next source frame has already been transcoded.

If at decision block 324 the media parser has not been instructed to skip to a new next source frame in the transcode segment then in an embodiment at decision block 328 a determination is made as to whether there are any more source frames for the current transcode segment to be transcoded. If yes, in an embodiment the media parser goes to the next source frame in the transcode segment that the media parser will transcode, if not already transcoded, which becomes the current source frame, 334. In an embodiment the next source frame to be transcoded is the next chronological source frame 185 in the transcode segment 126 from the source frame 185 that was just transcoded. In an alternative embodiment the next source frame 185 to be transcoded is a predetermined or calculated number of source frames 185 from the source frame 185 that was just transcoded.

In an embodiment at decision block 336 a determination is made as to whether the media parser has been issued another transcode preview request from the opportunistic transcoder. If yes, referring again to FIG. 3A in an embodiment the media parser finalizes transcoding the current source frame it is processing and stores the resultant transcoded framed in a preview file 314. In an embodiment the media parser goes to the start source frame, also referred to as the current source frame, in the transcode segment for the newly issued transcode preview request 316.

If at decision block 336 of FIG. 3B the media parser has not been issued a transcode preview request then in an embodiment at decision block 320 a determination is made as to whether the current source frame has already been transcoded.

If at decision block 328 there are no more source frames to transcode for the current transcode segment then in an embodiment the media parser notifies the opportunistic transcoder that all source frames for the transcode segment that will be transcoded are transcoded 330.

Referring again to FIG. 3A if at decision block 300 there is no transcode preview request from the opportunistic transcoder then in an embodiment at decision block 302 a determination is made as to whether the media parser has received a transcode encode request from the opportunistic transcoder; i.e., whether the media parser has been requested to transcode one or more source frames for an output file. If no, in an embodiment the media parser ends processing 350.

If at decision block 302 the media parser has received a transcode encode request, in an embodiment the media parser goes to, or otherwise identifies, the first source frame to be transcoded for an output file 304. In an embodiment the media parser transcodes the identified source frame with the requested quality, or if no requested quality a predetermined quality, or, alternatively, otherwise identified quality, and stores the resultant transcoded frame in the preview file 306.

In an embodiment at decision block 308 a determination is made as to whether there are more source frames to transcode for an output file. If yes, in an embodiment the media parser goes to, or otherwise identifies, the next source frame to transcode 310. In an embodiment the media parser transcodes this next source frame with the appropriate quality and stores the resultant transcoded frame in the preview file 306.

If at decision block 308 there are no more source frames to transcode for the output file then in an embodiment the media parser notifies the opportunistic transcoder that all requested source frames for the output file have been transcoded 312. Referring to FIG. 3C, in an embodiment at decision block 340 a determination is then made as to whether there are any source frames to transcode.

Figure 4A:
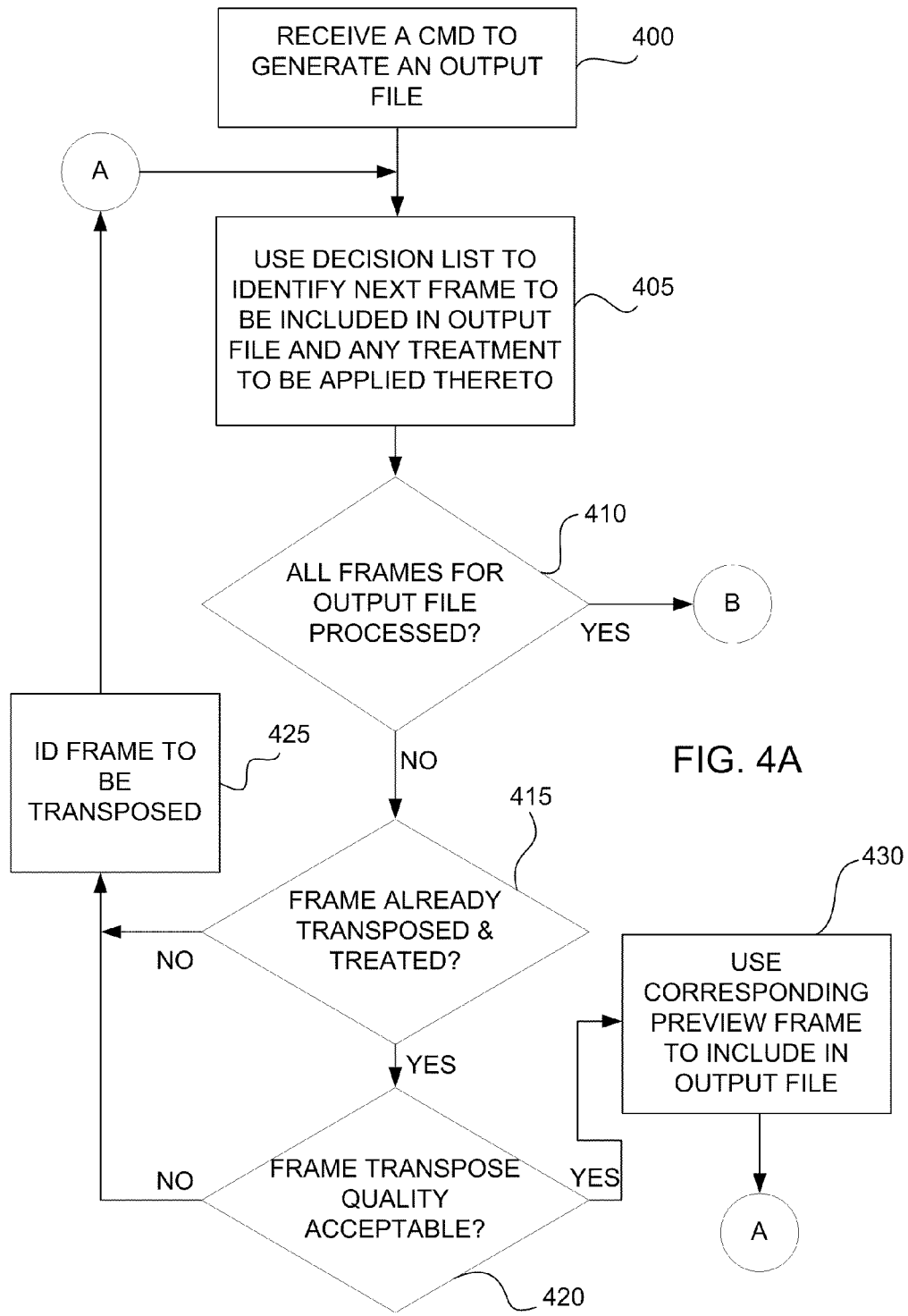
FIGS. 4A-4B illustrate an embodiment logic flow for an embodiment encoder component of an opportunistic frame cache system.
Figure 4B:
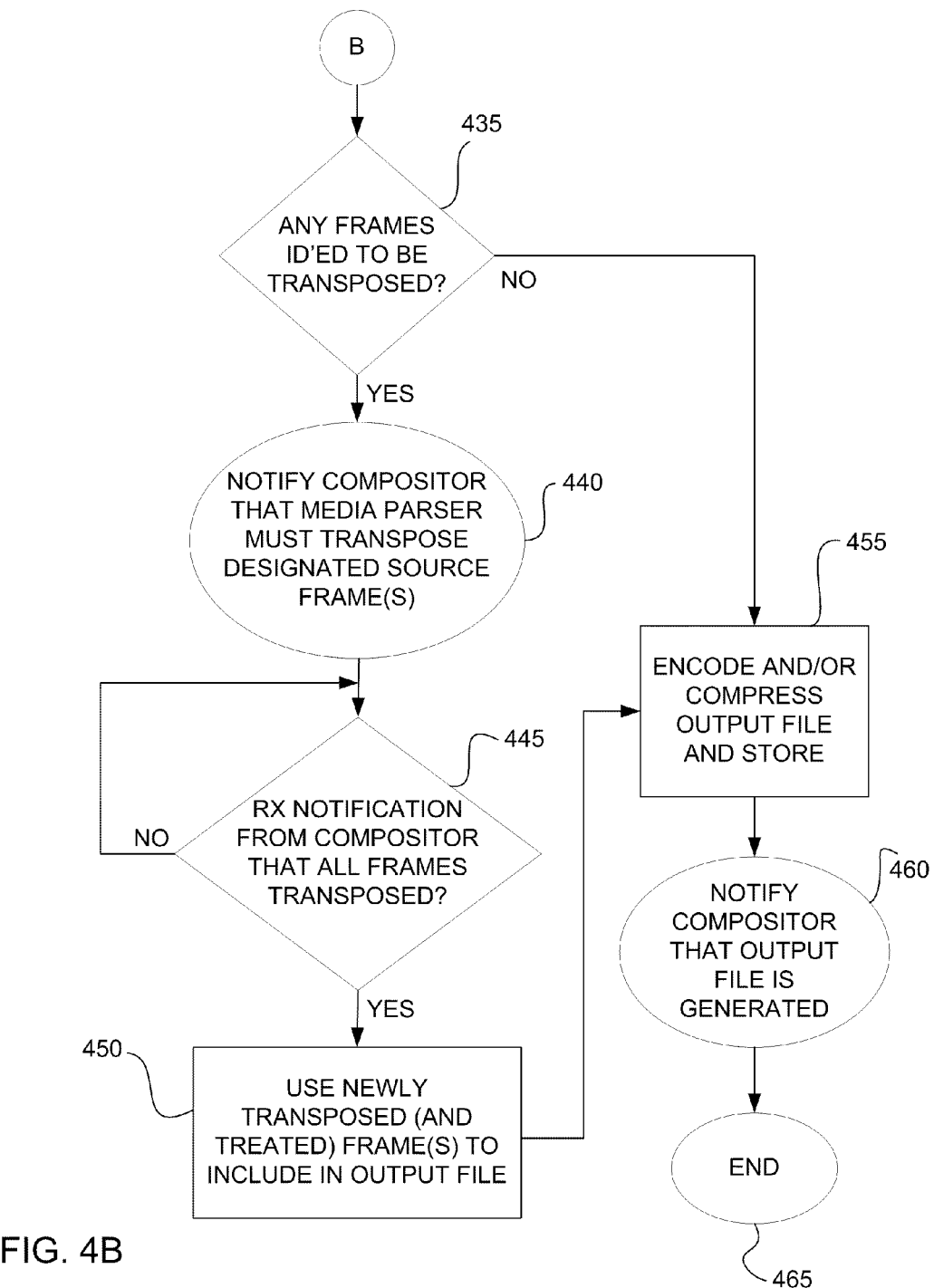

FIGS. 4A-4B illustrate an embodiment logic flow for an embodiment encoder 170 component of an OFC system 100. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment encoder 170, an embodiment encoder 170 in combination with one or more other OFC system components, or by one or more other OFC system components.

Referring to FIG. 4A, in an embodiment the encoder receives a command from the compositor to generate an output file 400. In an embodiment the encoder uses the decision list to identify a first frame to include in the output file and any treatment(s) to be applied thereto 405.

At decision block 410 a determination is made as to whether all the frames for the output file have been processed; i.e., whether the encoder has identified all the frames to be included in the output file. If no, at decision block 415 a determination is made as to whether the current identified frame to be included in the output file has already been transcoded, and if directed, treated; i.e., whether the current identified frame is in the preview file. If no, in an embodiment the encoder identifies the current frame as a source frame to transcode, and if directed, have one or more treatment(s) applied thereto 425. In an embodiment the encoder uses the decision list to identify, if there is one, a next chronological frame to be included in the output file and any treatment(s) to be applied thereto 405.

If at decision block 415 it is determined that the current frame is already transcoded and, if directed, had the instructed treatment(s) applied thereto, i.e., the current frame is a preview frame, then in an embodiment at decision block 420 a determination is made as to whether the transcoded frame is of an acceptable quality. In an embodiment transcoded frames 192 in the preview file 190 may not be of an end-result quality for an output file 135 as they were previously transcoded with a lower quality that was acceptable for previewing and which consumed less time and effort to help ensure a more timely preview session.

If at decision block 420 the transcoded frame the encoder is currently concerned with is of an acceptable quality for the output file then in an embodiment the encoder uses the corresponding preview frame, which will have any directed treatment(s) applied thereto, to include in the output file 430. In an embodiment the encoder once again refers to the decision list to identify a next frame to include in the output file and any treatment(s) to apply thereto 405.

If at decision block 420 the transcoded frame the encoder is currently concerned with is not of an acceptable quality then in an embodiment the encoder identifies the corresponding source frame as a source frame to transcode, and if directed, have one or more treatments applied thereto 425. In an embodiment the encoder uses the decision list to identify, if there is one, a next chronological frame to include in the output file and any treatment(s) to apply thereto 405.

If at decision block 410 all frames for the output file have been processed, then in an embodiment and referring to FIG. 4B, at decision block 435 a determination is made as to whether there are any frames for the output file whose corresponding source frames are to be transcoded. If no, in an embodiment the encoder encodes and/or compresses the resultant output file frames and stores the finalized output file 455. In an embodiment the encoder notifies the compositor that the output file has been generated 460. In an embodiment the encoder ends processing 465.

If at decision block 435 there are source frames for the output file that are to be transcoded then in an embodiment the encoder notifies the compositor that the media parser is to transcode one or more identified source frame(s) 440. In an embodiment at decision block 445 a determination is made as to whether the encoder has received a notification from the compositor that all requested source frames for the output file have been transcoded, and if directed, have the specified treatment(s) applied thereto. If yes, in an embodiment the encoder includes the newly processed transcoded frames in the output file 450 and encodes and/or compresses the resultant output frames and stores the finalized output file 455.

If at decision block 445 the encoder has not yet received a notification from the compositor that all the requested source frames for the output file have been transcoded and treated as directed then in an embodiment the encoder continues to wait for this notification from the compositor 445.

Figure 5A:
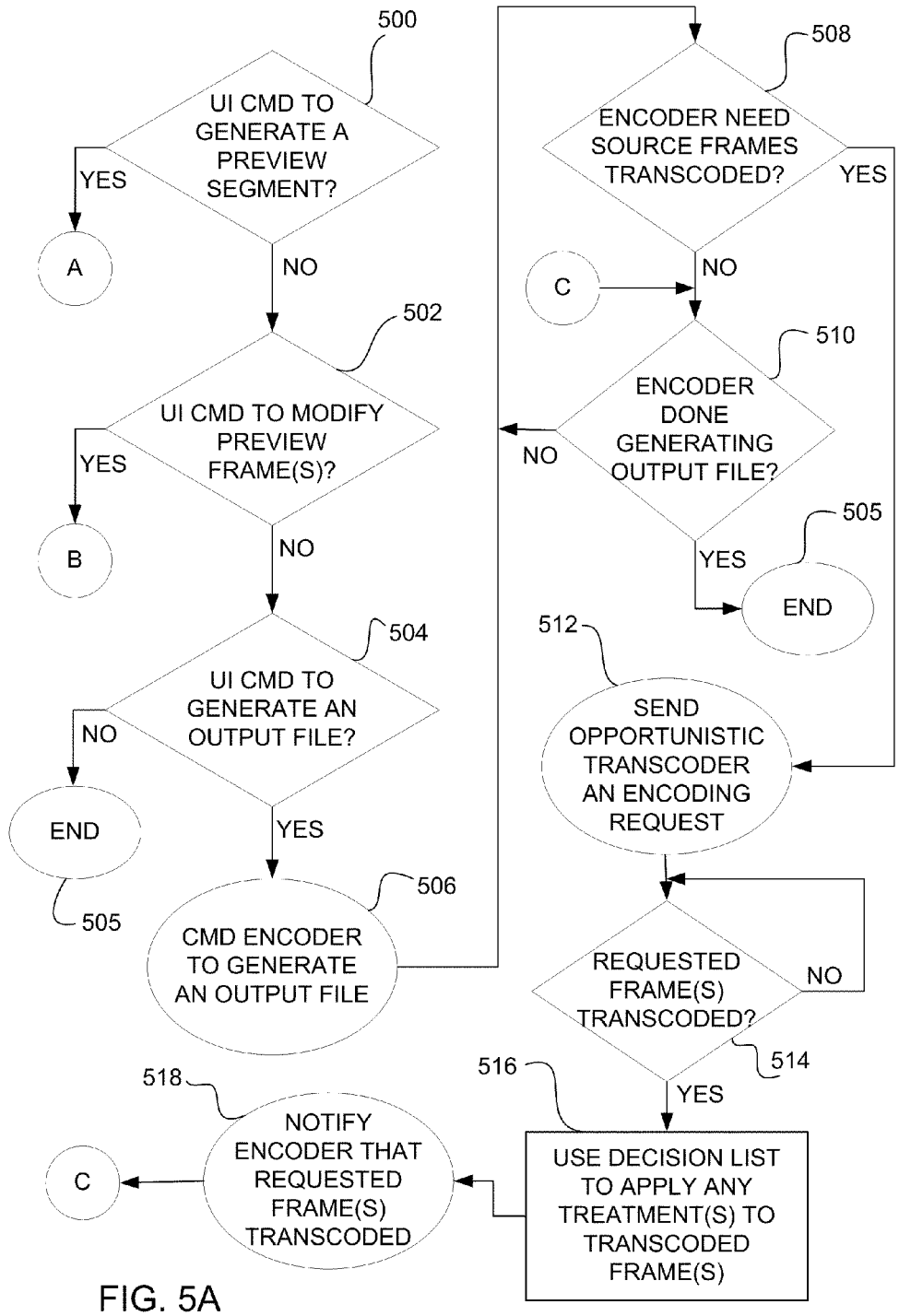
FIGS. 5A-5C illustrate an embodiment logic flow for an embodiment compositor component of an opportunistic frame cache system.
Figure 5B:
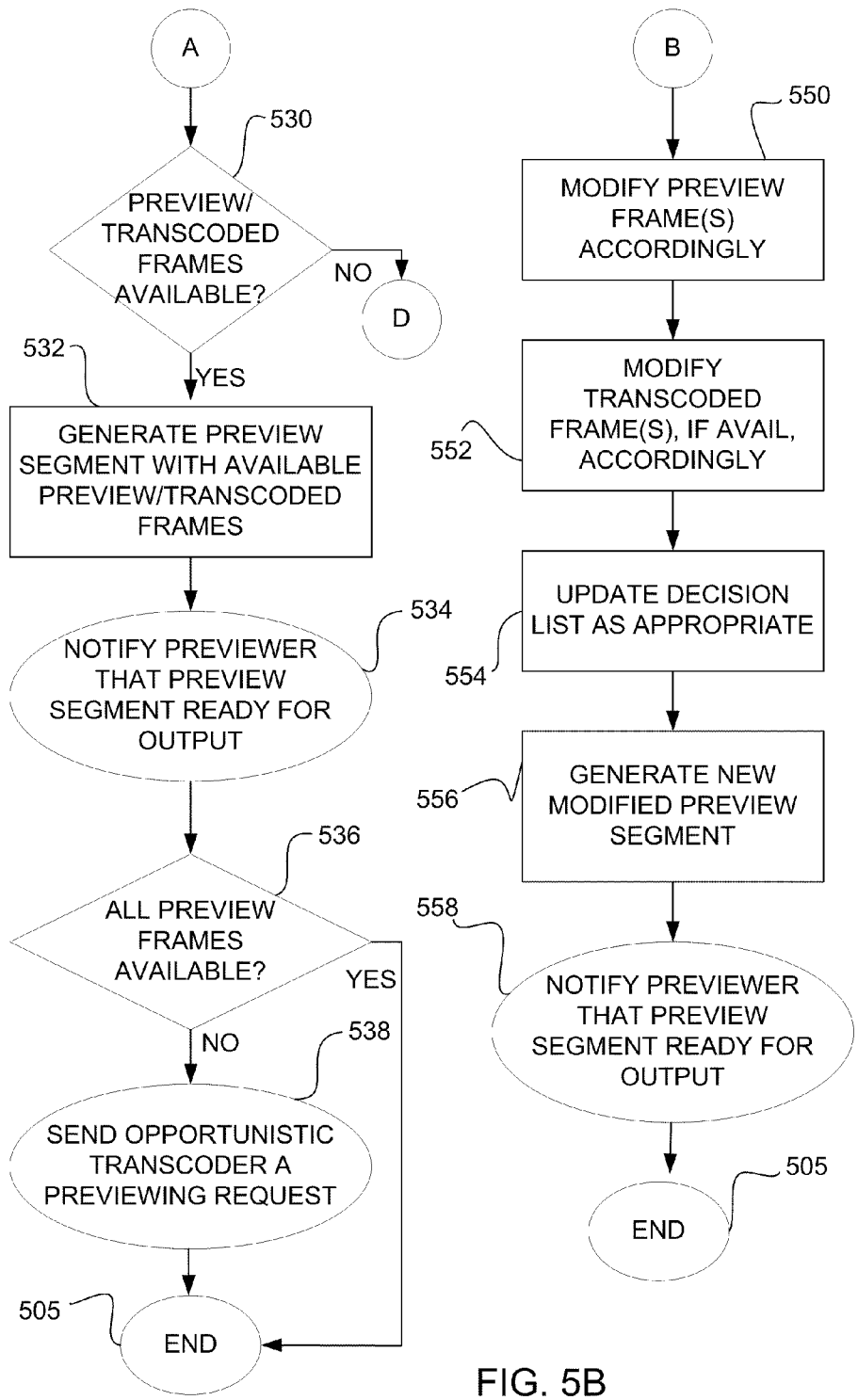
Figure 5C:
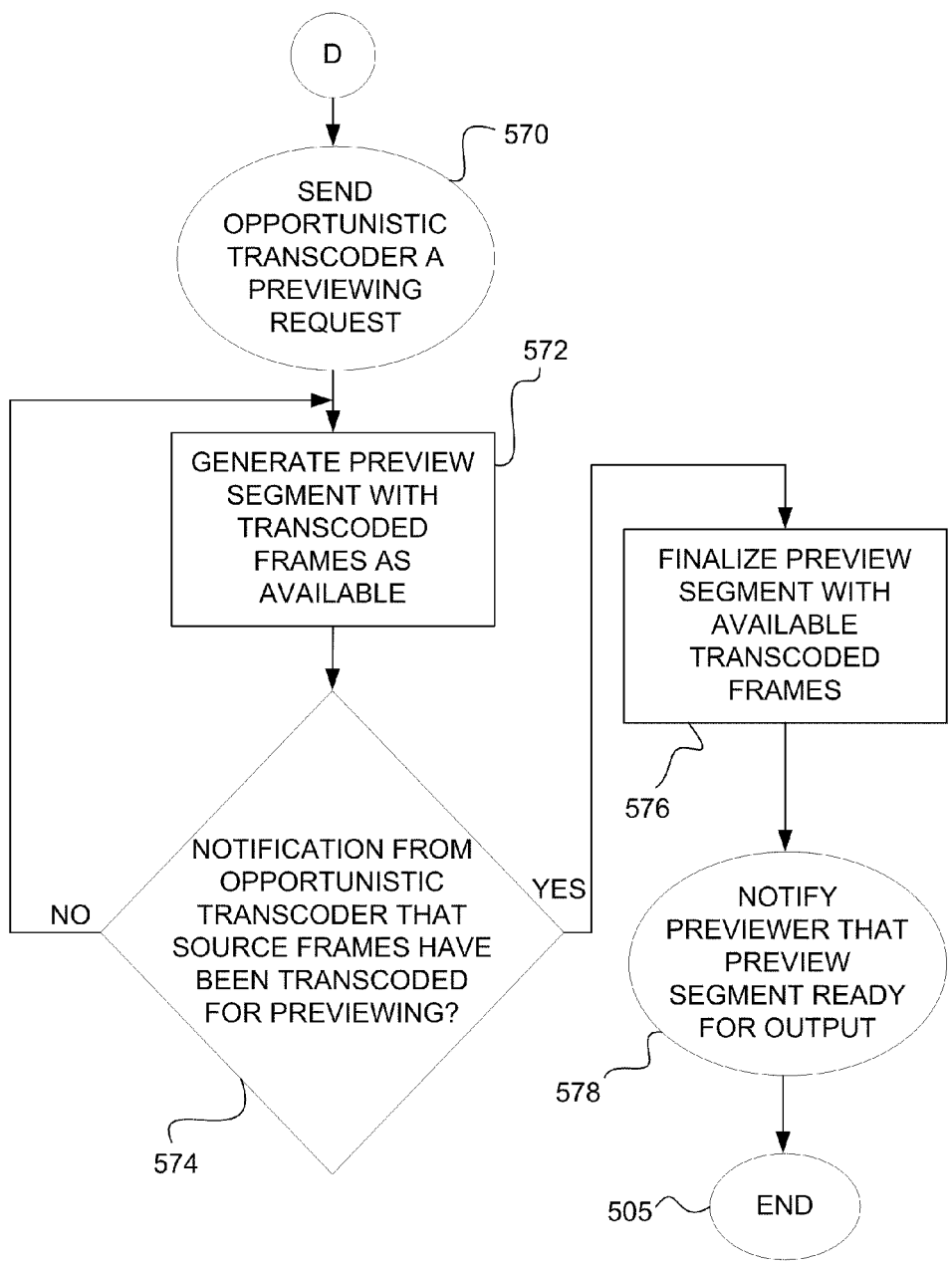

FIGS. 5A-5C illustrate an embodiment logic flow for an embodiment compositor 140 component of an OFC system 100. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment compositor 140, an embodiment compositor 140 in combination with one or more other OFC system components, or by one or more other OFC system components.

Referring to FIG. 5A, in an embodiment at decision block 500 a determination is made as to whether the compositor has received a command, or notification, from the UI to generate a preview segment for a user sampling segment. If yes, and referring to FIG. 5B, in an embodiment at decision block 530 a determination is made as to whether there are sufficient preview frames and/or transcoded frames available for the preview segment that would constitute an acceptable output quality preview segment for user previewing. If yes in an embodiment the compositor generates a preview segment with the available preview frames and/or transcoded frames, applying any prior user commanded treatments thereto, 532. In an embodiment the compositor notifies the previewer that the preview segment can be output 534.

In an embodiment at decision block 536 a determination is made as to whether all preview frames that could be included in the preview segment exist and are included in the preview segment. In this embodiment, while there are preview frames 195 and/or transcoded frames 192 available for a preview segment 125 for the user requested sampling segment 124 there may be source frames 185 in the corresponding transcode segment 126 that have not yet been transcoded and if transcoded could enhance the preview segment 125 quality.

If at decision block 536 more preview frames could be generated for the preview segment then in an embodiment the compositor sends the opportunistic transcoder a transcode preview request for the current user requested sampling segment 538. In an embodiment the compositor then ends processing 505.

If at decision block 536 there are no missing preview frames for the preview segment then in an embodiment the compositor ends processing 505.

If at decision block 530 there are no transcode or preview frames available for the current preview segment then in an embodiment and referring to FIG. 3C the compositor sends the opportunistic transcoder a transcode preview request for the current user requested sampling segment 570. In an embodiment the compositor generates a preview segment with transcoded frames as they become available 572; i.e., as the corresponding source frames are transcoded by the media parser and stored in the preview file where the compositor can gain access to them.

In an embodiment at decision block 574 a determination is made as to whether the compositor has received a notification, or some signal or indication, from the opportunistic transcoder that source frames for the current preview request have been transcoded. If no, in an embodiment the compositor continues to generate the preview segment with transcoded frames as they become available 572.

If at decision block 574 the compositor has been notified that the media parser has transcoded source frames for the current preview segment then in an embodiment the compositor finalizes generating the preview segment with available transcoded frames and applies any treatment(s) pursuant to prior user command(s) 576. In an embodiment the compositor notifies the previewer that the preview segment can be output to the user 578 and ends processing 505.

Referring again to FIG. 5A, if at decision block 500 the compositor has not received a request to generate a preview segment then in an embodiment at decision block 502 a determination is made as to whether the compositor has received a command from the UI to modify one or more preview frames. In an embodiment a user can request to modify one or more preview frames by applying a treatment, e.g., fade in, fade out, etc., to one or more preview frames, reordering the preview frames, etc. If the compositor has received a command to modify one or more preview frames then in an embodiment and referring to FIG. 5B the compositor modifies the indicated preview frame(s) as directed 550. In an embodiment the compositor includes any new transcoded frames for the preview segment in the preview segment that have become available since the last time the compositor generated, or modified, the preview segment 552. In an embodiment the compositor applies any user-specified treatments as appropriate to the newly added transcoded frames in the preview segment 552.

In an embodiment the compositor updates the decision list to identify any changes made to any preview frame(s), transcoded frame additions to the preview segment and any changes made to any newly added transcoded frames 554. In an embodiment the compositor generates a new preview segment, or alternatively, modifies the existing preview segment, to reflect the changes made 556. In an embodiment the compositor notifies the previewer that a preview segment is ready for output to the user 558 and the compositor finalizes processing 505.

Referring again to FIG. 5A, if at decision block 502 there is no command to modify one or more preview frames then in an embodiment at decision block 504 a determination is made as to whether the compositor has been issued a command by the UI to generate an output file. If no, in an embodiment compositor processing is finalized 505.

If the compositor has received a command to generate an output file then in an embodiment the compositor notifies, or otherwise commands, the encoder to generate the requested output file 506. In an embodiment at decision block 508 a determination is made as to whether the encoder has notified the compositor that one or more source frames need to be transcoded for the output file. If yes, in an embodiment the compositor sends the opportunistic transcoder an encoding request identifying the source frame(s) to transcode and, if requested, the transcode quality to be applied thereto 512.

In an embodiment at decision block 514 a determination is made as to whether the requested source frames have been transcoded. If no, in an embodiment the compositor waits until the requested source frames have been transcoded 514. Once the requested source frames are transcoded, in an embodiment the compositor uses the decision list to determine if any treatment(s) are to be applied to any transcoded frame just transcoded for an output file, and if so, applies the indicated treatment(s) to the identified transcoded frames 516.

In an embodiment the compositor notifies the encoder that the requested source frames have been transcoded 518. In an embodiment at decision block 510 a determination is made as to whether the encoder is done generating the output file. If yes, in an embodiment compositor processing is finalized 505.

If at decision block 510 the encoder has not finalized the output file then in an embodiment at decision block 508 a determination is made as to whether the encoder requires one or more source frames to be transcoded for the output file. If no, in an embodiment at decision block 510 a determination is made as to whether the encoder has finalized generating the output file.

While in embodiments discussed herein tasks have been assigned to various identified components of an embodiment OFC system 100, in other embodiments the described tasks can be performed by other and/or additional components. For example, in another embodiment the tasks of the opportunistic transcoder 150 and the media parser 160 may be combined and performed by a media parser. As another example, in still another embodiment the tasks of the opportunistic transcoder 150 and the compositor 140 may be combined and performed by a compositor. In still other examples and embodiments tasks can be assigned additional and/or different system component(s).

Computing Device System Configuration

Figure 6:
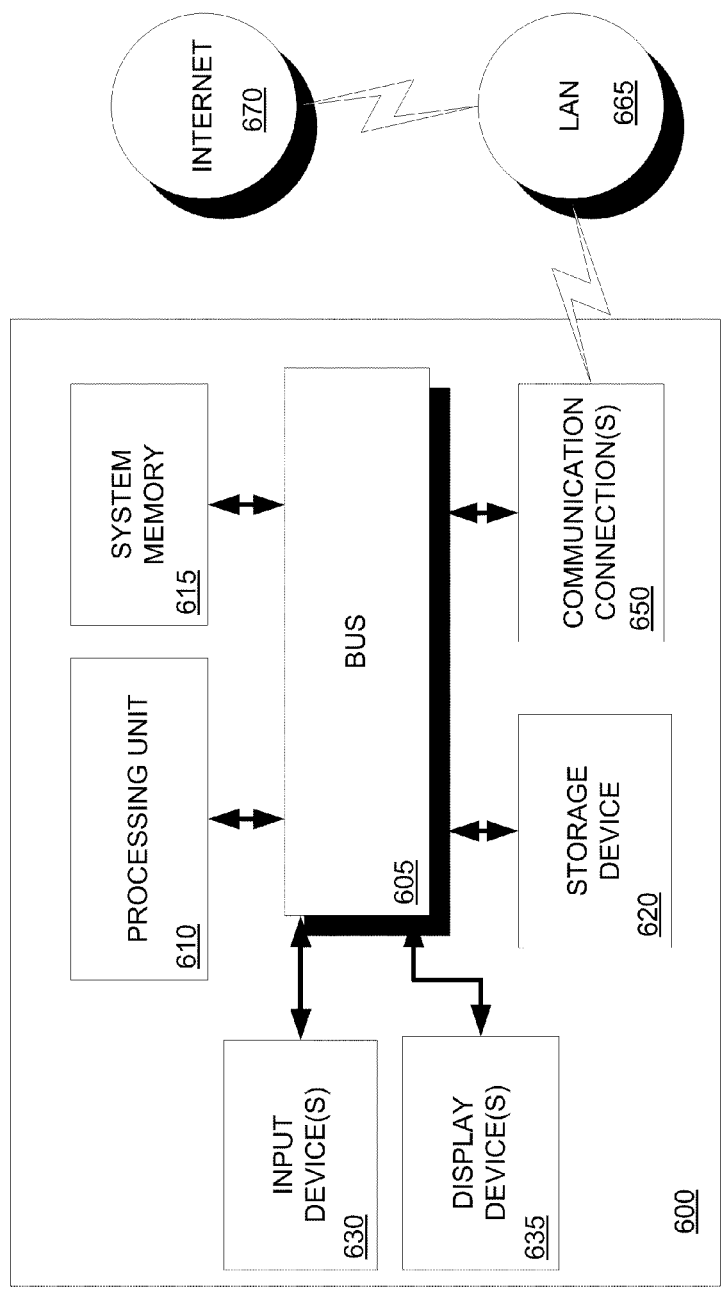
FIG. 6 is a block diagram of an exemplary basic computing device system that can process software, i.e., program code, or instructions.

FIG. 6 is a block diagram that illustrates an exemplary computing device system 600 upon which an embodiment can be implemented. The computing device system 600 includes a bus 605 or other mechanism for communicating information, and a processing unit 610 coupled with the bus 605 for processing information. The computing device system 600 also includes system memory 615, which may be volatile or dynamic, such as random access memory (RAM), non-volatile or static, such as read-only memory (ROM) or flash memory, or some combination of the two. The system memory 615 is coupled to the bus 605 for storing information and instructions to be executed by the processing unit 610, and may also be used for storing temporary variables or other intermediate information during the execution of instructions by the processing unit 610. The system memory 615 often contains an operating system and one or more programs, and may also include program data.

In an embodiment, a storage device 620, such as a magnetic or optical disk, is also coupled to the bus 605 for storing information, including program code comprising instructions and/or data.

The computing device system 600 generally includes one or more display devices 635, such as, but not limited to, a display screen, e.g., a cathode ray tube (CRT) or liquid crystal display (LCD), a printer, and one or more speakers, for providing information to a computing device user. The computing device system 600 also generally includes one or more input devices 630, such as, but not limited to, a keyboard, mouse, trackball, pen, voice input device(s), and touch input devices, which a computing device user can use to communicate information and command selections to the processing unit 610. All of these devices are known in the art and need not be discussed at length here.

The processing unit 610 executes one or more sequences of one or more program instructions contained in the system memory 615. These instructions may be read into the system memory 615 from another computing device-readable medium, including, but not limited to, the storage device 620. In alternative embodiments, hard-wired circuitry may be used in place of or in combination with software program instructions. The computing device system environment is not limited to any specific combination of hardware circuitry and/or software.

The term "computing device-readable medium" as used herein refers to any medium that can participate in providing program instructions to the processing unit 610 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 615 and storage device 620 of the computing device system 600 are further examples of storage media. Examples of transmission media include, but are not limited to, wired media such as coaxial cable(s), copper wire and optical fiber, and wireless media such as optic signals, acoustic signals, RF signals and infrared signals.

The computing device system 600 includes one or more communication connections 650 coupled to the bus 605. The communication connection(s) 650 provide a two-way data communication coupling from the computing device system 600 to other computing devices on a local area network (LAN) 665 and/or wide area network (WAN), including the World Wide Web, or Internet 670. Examples of the communication connection(s) 650 include, but are not limited to, an integrated services digital network (ISDN) card, modem, LAN card, and any device capable of sending and receiving electrical, electromagnetic, optical, acoustic, RF or infrared signals.

The computing device system 600 also includes one or more communication connections 650 coupled to the bus 605 that provide a one or two-way data communication coupling between the computing device system 600 and other devices connected thereto and/or in communication therewith. Examples of such other devices include, but are not limited to, video cameras 155, tape reels 165, CDs 175, cameras, camcorders, video capture and conversion devices, etc.

Communications received by the computing device system 600 can include program instructions and program data. The program instructions received by the computing device system 600 may be executed by the processing unit 610 as they are received, and/or stored in the storage device 620 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for opportunistic source file frame previewing, the method comprising:
   receiving a first preview request;
   in response to the first preview request, identifying a starting point of a first sampling segment that is to be transcoded in response to the first preview request and an ending point of the first sampling segment that is to be transcoded in response to the first preview request, wherein the first sampling segment includes a first subset of frames of a first source file from the starting point of the first sampling segment to the ending point of the first sampling segment;
   receiving, after the first preview request, a second preview request;
   in response to the second preview request, identifying a starting point of a second sampling segment that is to be transcoded in response to the second preview request and an ending point of the second sampling segment that is to be transcoded in response to the second preview request, wherein the second sampling segment includes a second subset of frames of the first source file from the starting point of the second sampling segment to the ending point of the second sampling segment;

transcoding at least a portion of the frames of the second subset; and in response to completion of the transcoding of at least the portion of the frames of the second subset, transcoding a first frame of the first subset that has not been transcoded.

2. The method for opportunistic source file frame previewing of claim 1, wherein the source file is a video file.

3. The method for opportunistic source file frame previewing of claim 1, wherein:

transcoding at least the frames of the second subset includes:

transcoding at least the plurality of frames of the second segment prior to transcoding any frames that are not in the second segment, the plurality of frames of the second segment being at least a portion of a preview of the second segment; and wherein the method further comprises:

transcoding frames that are not in the first segment and are not in the second segment after there are no frames to transcode pursuant to the first preview request or the second preview request.

4. The method for opportunistic source file frame previewing of claim 3, wherein there are no source frames to transcode pursuant to the first preview request or the second preview request after frames for the first preview request and for the second preview request have been transcoded.

5. The method for opportunistic source file frame previewing of claim 3, wherein there are no source frames to transcode pursuant to the first preview request or the second preview request after all frames of the first segment and of the second segment have been transcoded.

6. The method for opportunistic source file frame previewing of claim 1, wherein the method further comprises:

transcoding frames of the first segment before receiving the second preview request.

7. The method for opportunistic source file frame previewing of claim 6, wherein:

transcoding frames of the first segment before receiving the second preview request includes:

transcoding at least the plurality of frames of the first segment prior to transcoding any frames that are not in the first segment, the plurality of frames of the first segment being at least a portion of a preview of the first segment; and wherein transcoding the frames of the second subset includes:

transcoding at least the plurality of frames of the second segment prior to transcoding any frames that are not in the second segment, the plurality of frames of the second segment being at least a portion of a preview of the second segment.

8. The method for opportunistic source file frame previewing of claim 1, wherein the method further comprises:

storing each frame that is transcoded as a transcoded frame;

using the transcoded frames to generate preview frames in a preview segment;

outputting the preview segment in response to a preview request;

generating a decision list comprising information that identifies the transcoded frames of the preview segment; and generating an output file using the decision list and one or more transcoded frames.

9. The method for opportunistic source file frame previewing of claim 1, further comprising:

receiving a third preview request for a third sampling segment of a second source file, wherein the third sampling segment is comprised of a third subset of frames from the second source file;

stopping transcoding of the first file in response to the third preview request; and resuming transcoding of the first file after transcoding at least one frame of the second file that is not within the third portion.

10. A method for enabling opportunistic frame caching, the method comprising:

transcoding a first portion of a source file in response to a first preview request, the first portion being associated with the first preview request and the first portion being defined by a first starting point and a first ending point, and wherein the first ending point defines a last source frame that is to be transcoded for the first preview request;

receiving a second preview request, the second preview request being for a second portion of the source file, the second portion being defined by a second starting point and a second ending point, and wherein the second ending point defines a last source frame that is to be transcoded for the second preview request;

in response to receiving the second preview request:
pre-empting the transcoding of the first portion; and
transcoding the second portion of the source file; and in response to a completion of the transcoding of the second portion, resuming the transcoding of the first portion.

11. The method for enabling opportunistic frame caching of claim 10, wherein the method further comprises:

storing the transcoded first portion and the transcoded second portion.

12. The method for enabling opportunistic frame caching of claim 10, wherein the method further comprises:

applying a treatment to at least the first portion.

13. The method for enabling opportunistic frame caching of claim 11, wherein the method further comprises:

storing the transcoded first portion and the transcoded second portion within an output file in a resequenced order.

14. The method for enabling opportunistic frame caching of claim 10, wherein:

transcoding the second portion includes:

transcoding at least a plurality of frames of the second portion prior to transcoding any frames that are not in the second portion, the plurality of frames of the second portion being at least a portion of a preview of the second portion.

15. The method for enabling opportunistic frame caching of claim 14, wherein the method further comprises:

completing the transcoding of the first portion before transcoding any frames that are neither in the first portion nor in the second portion.

16. The method for enabling opportunistic frame caching of claim 15, wherein the method further comprises:

in response to completing the transcoding of the first portion, transcoding a first untranscoded frame of the source file.

17. A computer-readable storage memory having instructions encoded therein for performing operations that include:
transcoding a first portion of a source file in response to a first preview request, the first portion being associated with the first preview request and the first portion being defined by a first starting point and a first ending point, and wherein the first ending point defines a last source frame of the source file that is to be transcoded in response to the first preview request;
receiving a second preview request, the second preview request being for a second portion of the source file, the second portion being defined by a second starting point and a second ending point, and wherein the second ending point defines a last source frame of the source file that is to be transcoded in response to the second preview request;
in response to receipt of the second preview request:
pre-empting the transcoding of the first portion; and
transcoding the second portion of the source file; and
in response to a completion of the transcoding of the second portion, resuming the transcoding of the first portion.

18. The computer-readable storage memory of claim 17, wherein:
transcoding the second portion includes:
transcoding at least a plurality of frames of the second portion prior to transcoding any frames that are not in the second portion, the plurality of frames of the second portion being at least a portion of a preview of the second portion.

19. The computer-readable storage memory of claim 18, wherein the operations further include:
completing the transcoding the first portion before transcoding any frames that are neither in the first portion nor in the second portion.

20. The computer-readable storage memory of claim 19, wherein the operations further include:
in response to completing the transcoding of the first portion, transcoding a first untranscoded frame of the source file.

\* \* \* \* \*